US012762277B2

(12) United States Patent
Gupta et al.

(10) Patent No.: US 12,762,277 B2
(45) Date of Patent: Oct. 13, 2026

(54) SYSTEMS AND METHODS FOR DISTRIBUTED KEY GENERATION FOR QUORUM BASED DECRYPTION

(71) Applicant: BeeKeeperAI, Inc., Larkspur, CA (US)

(72) Inventors: Pavan Gupta, Oakland, CA (US); Michael Scott Blum, Scottsdale, AZ (US); Mary Elizabeth Chalk, Austin, TX (US); Robert Derward Rogers, Oakland, CA (US); Syam Babu Malampati, Antioch, CA (US); Sudish Mogli, San Jose, CA (US); Kurian Davy Manavalan, Prosper, TX (US); Taljinder Kaur, Brampton (CA)

(73) Assignee: BeeKeeperAI, Inc., Austin, TX (US)

( * ) Notice: Subject to any disclaimer, the term of this patent is extended or adjusted under 35 U.S.C. 154(b) by 21 days.

(21) Appl. No.: 18/941,314

(22) Filed: Nov. 8, 2024

(65) Prior Publication Data

US 2025/0068766 A1 Feb. 27, 2025

Related U.S. Application Data

(60) Continuation-in-part of application No. 18/883,533, filed on Sep. 12, 2024, which is a division of
(Continued)

(51) Int. Cl.
*G06F 21/62* (2013.01)
*G06F 21/60* (2013.01)
*H04L 9/08* (2006.01)

(52) U.S. Cl.
CPC ........ *G06F 21/6245* (2013.01); *G06F 21/602* (2013.01); *H04L 9/085* (2013.01)

(58) Field of Classification Search
CPC ................ G06F 21/602; G06F 21/606; G06F 21/62–6281; H04L 9/0816;
(Continued)

(56) References Cited

U.S. PATENT DOCUMENTS

| | | | |
|---|---|---|---|
| 8,346,534 B2 | 1/2013 | Csomai et al. | |
| 9,002,002 B1 | 4/2015 | Poo et al. | |

(Continued)

FOREIGN PATENT DOCUMENTS

| | | | |
|---|---|---|---|
| EP | 3449414 | B1 | 12/2021 |
| WO | 2022072892 | A1 | 4/2022 |
| WO | 2023059478 | A1 | 4/2023 |

OTHER PUBLICATIONS

International Search Report and Written Opinion from PCT Application No. PCT/US2024/055279 dated Jan. 16, 2025, 11 pages.

(Continued)

*Primary Examiner* — Kevin Bechtel
(74) *Attorney, Agent, or Firm* — IP Strategy Consulting

(57) ABSTRACT

Systems and methods for distributed key generation is provided. In some embodiments, a public key and a private key are generated using elliptical curve cryptography (ECC) at a group of trusted parties. In some cases, an elliptical curve digital signature algorithm may be employed. Each party also generates a commitment and a blinding factor. The blinding factor may be a randomized polynomial integer. The parties use the commitments from the other parties to validate the public keys before receipt and combining the public keys into a group/aggregate public key. Content encryption keys (CEK) are then encrypted at each of the trusted parties using these aggregate public keys to generate wrapped content encryption keys (WCEK). Private keys are sharded and a sharded private key is generated at each party using the pieces of shards received by the trusted party.
(Continued)

Subsequently, criteria may be received that allows for the release of these sharded private keys back to a trusted environment/enclave.

21 Claims, 23 Drawing Sheets

Related U.S. Application Data application No. 17/953,215, filed on Sep. 26, 2022, now Pat. No. 12,099,630, application No. 18/941,314 is a continuation-in-part of application No. 18/830, 481, filed on Sep. 10, 2024, which is a continuation of application No. 17/955,331, filed on Sep. 28, 2022, now Pat. No. 12,093,423, which is a continuation-in-part of application No. 17/953,215, filed on Sep. 26, 2022, now Pat. No. 12,099,630, and a continuation-in-part of application No. PCT/US2022/044871, filed on Sep. 27, 2022, application No. 18/941,314 is a continuation-in-part of application No. 18/171,301, filed on Feb. 17, 2023, now Pat. No. 12,339,993, which is a continuation-in-part of application No. 18/169,867, filed on Feb. 15, 2023, now Pat. No. 12,111,951, which is a continuation of application No. 18/169,122, filed on Feb. 14, 2023, now Pat. No. 12,141,319, which is a continuation of application No. 18/168,560, filed on Feb. 13, 2023, now Pat. No. 12,524,567, said application No. 18/169,867 is a continuation of application No. 18/169,111, filed on Feb. 14, 2023, now Pat. No. 12,423,469, which is a continuation of application No. 18/168,560, filed on Feb. 13, 2023, now Pat. No. 12,524,567.

(60) Provisional application No. 63/598,086, filed on Nov. 11, 2023, provisional application No. 63/252,131, filed on Oct. 4, 2021, provisional application No. 63/277,149, filed on Nov. 8, 2021, provisional application No. 63/313,774, filed on Feb. 25, 2022.

(58) Field of Classification Search
CPC ......... H04L 9/0838–0847; H04L 9/085; H04L 9/0852–0858; H04L 9/0861–0877
See application file for complete search history.

(56) References Cited

U.S. PATENT DOCUMENTS 10,133,878 B2 11/2018 Horvitz et al.
11,409,993 B2 8/2022 Ghosh et al.
11,531,904 B2 12/2022 Callcut et al.
12,093,423 B2 9/2024 Chalk et al.
12,099,630 B2 9/2024 Chalk et al.
12,111,951 B2 10/2024 Chalk et al.
2002/0174086 A1 11/2002 Verma
2004/0158581 A1 8/2004 Koltyar
2005/0075846 A1 4/2005 Kim
2008/0235575 A1 9/2008 Weiss
2009/0254971 A1 10/2009 Herz et al.
2012/0124050 A1 5/2012 Yang
2014/0304505 A1 10/2014 Dawson
2015/0003615 A1* 1/2015 Vanstone ............. H04L 9/0847 380/282
2015/0142807 A1 5/2015 Hofmann
2015/0347940 A1 12/2015 Doganata
2017/0068477 A1 3/2017 Yu
2017/0243028 A1 8/2017 Lafever et al.
2017/0258390 A1 9/2017 Howard
2018/0018590 A1 1/2018 Szeto
2018/0041477 A1 2/2018 Shaposhnik
2018/0114142 A1 4/2018 Mueller
2018/0150609 A1 5/2018 Kim et al.
2018/0165418 A1 6/2018 Swartz
2018/0182037 A1 6/2018 Lange et al.
2018/0294047 A1 10/2018 Hosseini et al.
2018/0359084 A1 12/2018 Jain et al.
2018/0359085 A1 12/2018 Jain et al.
2019/0034919 A1* 1/2019 Nolan .................... G06Q 20/36
2020/0082270 A1 3/2020 Gu et al.
2020/0104705 A1 4/2020 Bhowmick et al.
2020/0111019 A1 4/2020 Goodsitt et al.
2020/0184037 A1 6/2020 Zatloukal
2020/0210867 A1 7/2020 Banis et al.
2020/0259651 A1* 8/2020 Mohassel ............. H04L 9/3218
2020/0311300 A1 10/2020 Callcut
2020/0311607 A1 10/2020 Mestres
2020/0314472 A1 10/2020 Rao
2020/0322820 A1 10/2020 Carter et al.
2020/0402625 A1 12/2020 Aravamudan
2021/0004864 A1 1/2021 Daub
2021/0041906 A1 2/2021 Ikarashi
2021/0092160 A1 3/2021 Crabtree et al.
2021/0092185 A1 3/2021 Derosa-Grund
2021/0141940 A1 5/2021 Naqvi et al.
2021/0150037 A1 5/2021 Radhakrishnan et al.
2021/0173854 A1 6/2021 Wilshinsky
2021/0176062 A1 6/2021 Chitalia et al.
2021/0294840 A1 9/2021 Lee
2021/0306164 A1 9/2021 Wei et al.
2021/0390201 A1 12/2021 Adhikari et al.
2022/0021711 A1 1/2022 Marsh et al.
2022/0092216 A1 3/2022 Mohassel et al.
2022/0141004 A1 5/2022 Murray
2022/0215243 A1 7/2022 Narayanaswami
2022/0270129 A1 8/2022 Dakic
2023/0030479 A1 2/2023 Reimann
2023/0061341 A1 3/2023 Shmueli
2023/0103681 A1 4/2023 Chalk et al.
2023/0107510 A1 4/2023 Chalk et al.
2023/0161811 A1 5/2023 Peng
2023/0259654 A1 8/2023 Jalal et al.
2023/0274024 A1 8/2023 Chalk et al.
2023/0274025 A1 8/2023 Chalk et al.
2023/0274026 A1 8/2023 Chalk et al.
2023/0315902 A1 10/2023 Chalk et al.
2023/0325757 A1 10/2023 Conway
2023/0368070 A1 11/2023 Bhargava
2023/0396692 A1 12/2023 Demchenko et al.
2024/0154942 A1 5/2024 Gharibi

OTHER PUBLICATIONS

International Search Report and Written Opinion from PCT Application No. PCT/US2022/044870 dated Mar. 10, 2023, 13 pages.
International Search Report and Written Opinion from PCT Application No. PCT/US2022/045463 dated Apr. 7, 2023, 17 pages.
International Search Report and Written Opinion from PCT Application No. PCT/US2023/063083 dated Jul. 24, 2023, 16 pages.
Al-Rubaie et al., "Privacy-Preserving Machine Learning: Threats and Solutions", in IEEE Security & Privacy, vol. 17, No. 2, Mar.-Apr. 2019, pp. 49-58.
Deumens et al., "Secure Research Infrastructure Using tiCrypt", Jul. 22, 2021, 8 pages, retrieved from the internet, <https://dl.acm.org/doi/10.1145/3437359.3465577>.
Gonzalez-Abril et al. Statistical validation of synthetic data for lung cancer patients generated by using generative adversarial networks, Electronics, 11 (20), 2022, pp. 3277.
Hesamifard et al.,, "Privacy[preserving Machine Learning in Cloud", In Proceedings of the 2017 on Cloud Computing Security Workshop (CCWS'17).
Mohassel et al., :Secureml: A system for scalable privacy-preserving machine learning, 2017 IEEE symposium on security and privacy (SP), IEEE, 2017.
Zawafzki et al. "Synthetic Data Generation in Small Datasets to Improve Classification Performance for Chronic Heart FailurePredic-

(56) References Cited

OTHER PUBLICATIONS tion," 2023 Computing in Cardiology (CinC), Atlanta, GA, USA, 2023, pp. 1-4.

* cited by examiner

SYSTEMS AND METHODS FOR DISTRIBUTED KEY GENERATION FOR QUORUM BASED DECRYPTION

CROSS REFERENCE TO RELATED APPLICATIONS

This U.S. application claims the benefit and priority of U.S. Application No. 63/598,086, filed Nov. 11, 2023, the contents of each of which are incorporated herein in its entirety by this reference.

This U.S. application is also a continuation in part of U.S. application Ser. No. 18/883,533, filed Sep. 12, 2024, which is a division of U.S. application Ser. No. 17/953,215, filed Sep. 26, 2022, now U.S. Pat. No. 12,099,630, which claims the benefit and priority of U.S. Application No. 63/252,131, filed Oct. 4, 2021, the contents of each of which are incorporated herein in their entirety by this reference.

This U.S. application is also a continuation in part of U.S. application Ser. No. 18/830,481, filed Sep. 10, 2024, which is a continuation of U.S. application Ser. No. 17/955,331, filed Sep. 28, 2022, now U.S. Pat. No. 12,093,423, which claims the benefit and priority of U.S. Application No. 63/277,149, filed Nov. 8, 2021. U.S. application Ser. No. 17/955,331 is a continuation in part of PCT Application No. PCT/US2022/044870, filed Sep. 27, 2022, and is a continuation in part of Ser. No. 17/953,215, filed Sep. 26, 2022, which claim benefit and priority to U.S. Application No. 63/252,131, filed Oct. 4, 2021, the contents of each of which are incorporated herein in their entirety by this reference.

This U.S. application is also a continuation in part of U.S. application Ser. No. 18/171,301, filed Feb. 17, 2023, which is a continuation in part of U.S. application Ser. No. 18/169,867, filed Feb. 15, 2023, now U.S. Pat. No. 12,111,951, which is a continuation of U.S. application Ser. No. 18/169,122, filed Feb. 14, 2023, which is a continuation of U.S. application Ser. No. 18/168,560, filed Feb. 13, 2023. U.S. application Ser. No. 18/169,867 is a continuation of U.S. application Ser. No. 18/169,111, filed Feb. 14, 2023, which is a continuation of U.S. application Ser. No. 18/168,560, filed Feb. 13, 2023, which claims benefit and priority to U.S. Application No. 63/313,774, filed Feb. 25, 2022, the contents of each of which are incorporated herein in their entirety by this reference.

BACKGROUND

The present invention relates in general to the field of confidential computing, and more specifically to methods, computer programs and systems for distributed key generation for quorum-based content management. Such systems and methods are particularly useful in situations where multiple parties such as algorithm developers, data stewards, trusted computing management service providers, and the like wish to operate in tandem to ensure content is only made available when the various parties are all in agreement that said data should be decryptable/shared.

Within certain fields, there is a distinguishment between the developers of algorithms (often machine learning of artificial intelligence algorithms), and the stewards of the data that said algorithms are intended to operate with and be trained by. For the avoidance of doubt, an algorithm may include a model, code, pseudo-code, source code, or the like. On its surface, this seems to be an easily solved problem of merely sharing either the algorithm or the data that it is intended to operate with. However, in reality, there is often a strong need to keep the data and the algorithm secret. For example, the companies developing their algorithms may have the bulk of their intellectual property tied into the software comprising the algorithm. For many of these companies, their entire value may be centered in their proprietary algorithms. Sharing such sensitive data is a real risk to these companies, as the leakage of the software base code could eliminate their competitive advantage overnight.

One could imagine that instead, the data could be provided to the algorithm developer for running their proprietary algorithms and generation of the attendant reports. However, the problem with this methodology is two-fold. Firstly, often the datasets for processing and extremely large, requiring significant time to transfer the data from the data steward to the algorithm developer. Indeed, sometimes the datasets involved consume petabytes of data. The fastest fiber optics internet speed in the US is 2,000 MB/second. At this speed, transferring a petabyte of data can take nearly seven days to complete. It should be noted that most commercial internet speeds are a fraction of this maximum fiber optic speed.

The second reason that the datasets are not readily shared with the algorithm developers is that the data itself may be secret in some manner. For example, the data could also be proprietary, being of a significant asset value. Moreover, the data may be subject to some control or regulation. This is particularly true in the case of medical information. Protected health information, or PHI, for example, is subject to a myriad of laws, such as HIPAA and GDPR, that include strict requirements on the sharing of PHI, and are subject to significant fines if such requirements are not adhered to.

Healthcare related information is of particular focus in this application. Of all the global stored data, about 30% resides in healthcare. This data provides a treasure trove of information for algorithm developers to train their specific algorithm models (AI or otherwise) and allows for the identification of correlations and associations within datasets. Such data processing allows advancements in the identification of individual pathologies, public health trends, treatment success metrics, and the like. Such output data from the running of these algorithms may be invaluable to individual clinicians, healthcare institutions, and private companies (such as pharmaceutical and biotechnology companies). At the same time, the adoption of clinical AI has been slow. Data access is a major barrier to clinical approval. The FDA requires proof that a model works across the entire population. However, privacy protections make it challenging to access enough diverse data to accomplish this goal.

Within even trusted environments, data sharing is problematic. In some embodiments, there are use cases where data release (regardless of data type) may be subject to numerous 'mechanical criteria' such as being performed in a GDPR compliant jurisdiction. Layered on top of these mechanical considerations is often a need for a quorum of parties (full or partial) to agree to the release of data.

Given that there is great value in the ability to control the release of data unless and until more than one party is in agreement, and subject to mechanical constraints, systems and methods have been developed to enable distributed key generation. These distributed keys may ensure that a desired full or partial quorum is met before underlying data (of whatever form) is decryptable and therefore made available to each of the parties. Such systems and methods may further be deployed specifically within trusted environments, which can be attested to, to further ensure only the intended recipients gain access to the protected data.

SUMMARY

The present systems and methods relate to the distributed generation of encryption keys. Such systems allow for control over content decryption to situations only when a quorum of entities are in agreement that a decryption event should occur.

In some embodiments a public key and a private key are generated using elliptical curve cryptography (ECC) at a group of trusted parties. In some cases a elliptical curve digital signature algorithm may be employed. Each party also generates a commitment and a blinding factor. The blinding factor may be a randomized polynomial integer. The parties use the commitments from the other parties to validate the public keys before receipt and combining the public keys into a group/aggregate public key. Content encryption keys (CEK) are then encrypted at each of the trusted parties using these aggregate public keys to generate wrapped content encryption keys (WCEK). Private keys are sharded and a sharded private key is generated at each party using the pieces of shards received by the trusted party.

Sharding the private key includes dividing the private key in each trusted party into N pieces, wherein N is an integer corresponding to the number of the trusted parties, generating a schema for which unique piece of each private key is to be sent to each of the trusted parties, and transferring through direct communication between each of the trusted parties the appropriate unique piece of the private key according to the schema.

Subsequently, criteria may be received that allows for the release of these sharded private keys back to a trusted environment/enclave. The criteria include a location requirement for the plurality of trusted parties, in some cases. The private keys may then be reassembled as an aggregate private key, and the WCEK can be decrypted using this aggregated private key. Prior to releasing the sharded keys it may be desirable to perform an attestation on the trusted computing environment. This attestation may include an internal attestation and a third-party attestation.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

The present invention relates to systems and methods for the confidential computing application on one or more algorithms processing sensitive datasets. Such systems and methods may be applied to any given dataset, but may have particular utility within the healthcare setting, where the data is extremely sensitive. As such, the following descriptions will center on healthcare use cases. This particular focus, however, should not artificially limit the scope of the invention. For example, the information processed may include sensitive industry information, financial, payroll or other personally identifiable information, or the like. As such, while much of the disclosure will refer to protected health information (PHI) it should be understood that this may actually refer to any sensitive type of data. Likewise, while the data stewards are generally thought to be a hospital or other healthcare entity, these data stewards may in reality be any entity that has and wishes to process their data within a zero-trust environment.

In some embodiments, the following disclosure will focus upon the term "algorithm". It should be understood that an algorithm may include machine learning (ML) models, neural network models, or other artificial intelligence (AI) models.

However, algorithms may also apply to more mundane model types, such as linear models, least mean squares, or any other mathematical functions that convert one or more input values, and results in one or more output models.

Also, in some embodiments of the disclosure, the terms "node", "infrastructure" and "enclave" may be utilized. These terms are intended to be used interchangeably and indicate a computing architecture that is logically distinct (and often physically isolated). In no way does the utilization of one such term limit the scope of the disclosure, and these terms should be read interchangeably.

Figure 1A:
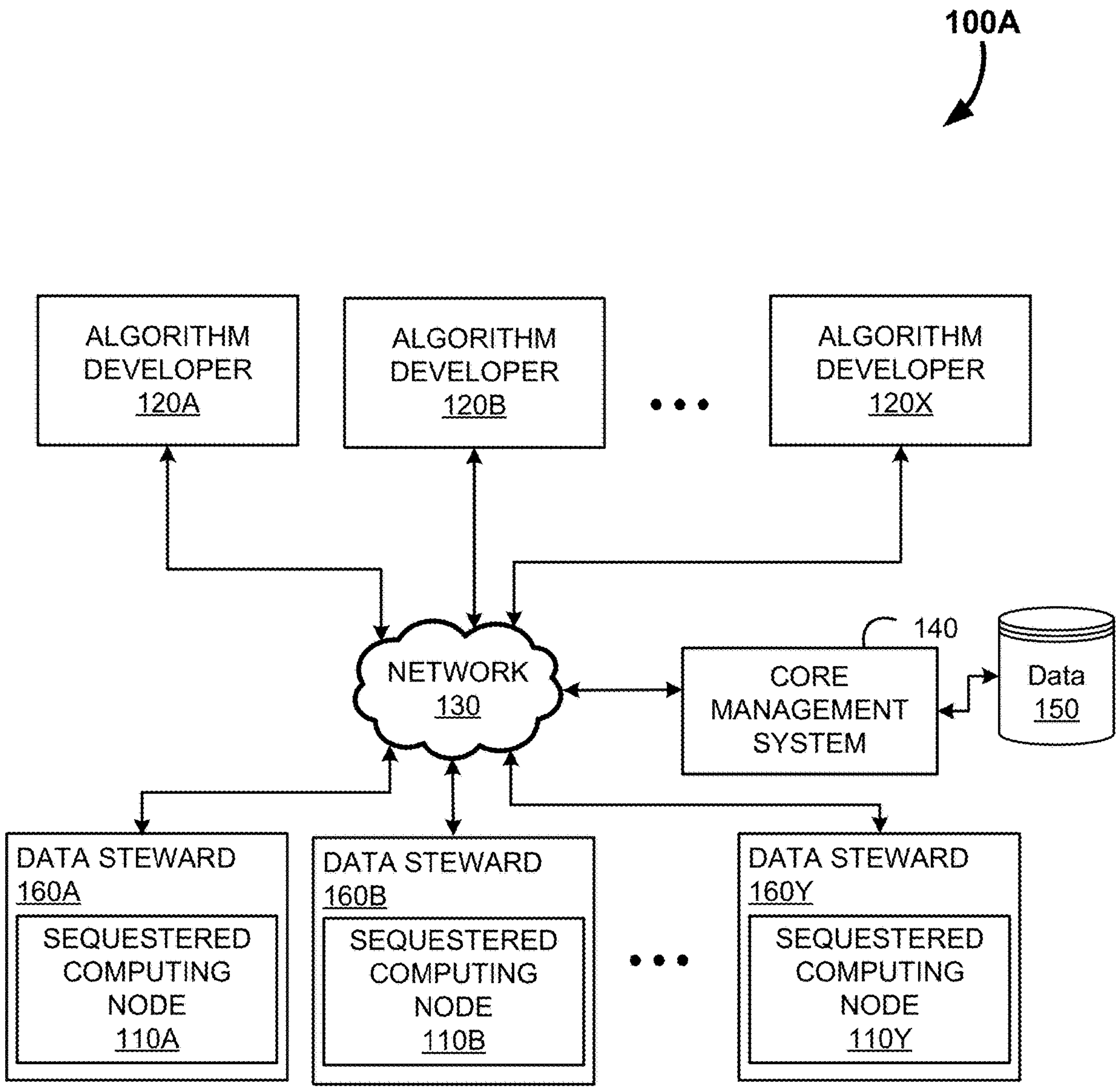
FIGS. 1A and 1B are example block diagrams of a system for zero trust computing of data by an algorithm, in accordance with some embodiment.

To facilitate discussions, FIG. 1A is an example of a confidential computing infrastructure, shown generally at 100*a*. This infrastructure includes one or more algorithm developers 120*a-x* which generate one or more algorithms for processing of data, which in this case is held by one or more data stewards 160*a-y*. The algorithm developers are generally companies that specialize in data analysis, and are often highly specialized in the types of data that are applicable to their given models/algorithms. However, sometimes the algorithm developers may be individuals, universities, government agencies, or the like. By uncovering powerful insights in vast amounts of information, AI and machine learning (ML) can improve care, increase efficiency, and reduce costs. For example, AI analysis of chest x-rays predicted the progression of critical illness in COVID-19. In another example, an image-based deep learning model developed at MIT can predict breast cancer up to five years in advance. And yet another example is an algorithm developed at University of California San Francisco, which can detect pneumothorax (collapsed lung) from CT scans, helping prioritize and treat patients with this life-threatening condition—the first algorithm embedded in a medical device to achieve FDA approval.

Likewise, the data stewards may include public and private hospitals, companies, universities, banks and other financial institutions, governmental agencies, or the like. Indeed, virtually any entity with access to sensitive data that is to be analyzed may be a data steward.

The generated algorithms are encrypted at the algorithm developer in whole, or in part, before transmitting to the data stewards, in this example ecosystem. The algorithms are transferred via a core management system 140, which may supplement or transform the data using a localized datastore 150. The core management system also handles routing and deployment of the algorithms. The datastore may also be leveraged for key management in some embodiments that will be discussed in greater detail below.

Each of the algorithm developer 120*a-x*, and the data stewards 160*a-y* and the core management system 140 may be coupled together by a network 130. In most cases the network is comprised of a cellular network and/or the internet. However, it is envisioned that the network includes any wide area network (WAN) architecture, including private WAN's, or private local area networks (LANs) in conjunction with private or public WANs.

Figure 3:
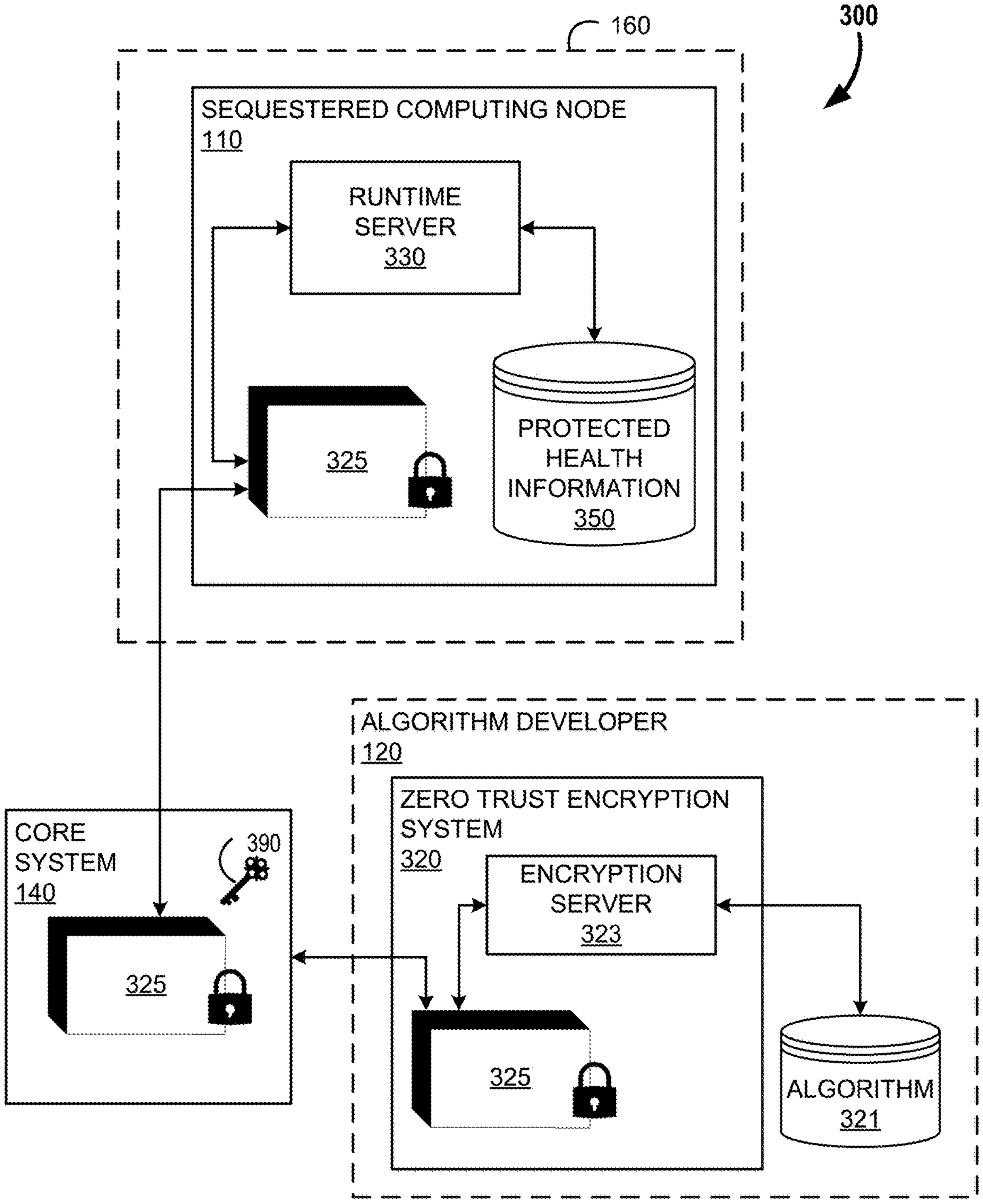
FIG. 3 is an example block diagram showing an example model for the confidential computing data flow, in accordance with some embodiment.

In this particular system, the data stewards maintain sequestered computing nodes 110*a-y* which function to actually perform the computation of the algorithm on the dataset. The sequestered computing nodes, or "enclaves", may be physically separate computer server systems, or may encompass virtual machines operating within a greater network of the data steward's systems. The sequestered computing nodes should be thought of as a vault. The encrypted algorithm and encrypted datasets are supplied to the vault, which is then sealed. Encryption keys 390, as seen in FIG. 3, unique to the vault are then provided, which allows the decryption of the data and models to occur. No party has access to the vault at this time, and the algorithm is able to securely operate on the data. The data and algorithms may then be destroyed, or maintained as encrypted, when the vault is "opened" in order to access the report/output derived from the application of the algorithm on the dataset. Due to the specific sequestered computing node being required to decrypt the given algorithm(s) and data, there is no way they can be intercepted and decrypted. This system relies upon public-private key techniques, where the algorithm developer utilizes the public key 390 for encryption of the algorithm, and the sequestered computing node includes the private key in order to perform the decryption. In some embodiments, the private key may be hardware (in the case of Azure, for example) or software linked (in the case of AWS, for example). In other embodiments, the algorithm may be encrypted using a symmetric key, and the symmetric key may be wrapped encrypted by a public key. Specifically, the algorithm developer has their own symmetrical key (content encryption key) used to encrypt the algorithm. The algorithm developer uses the public key to encrypt or "wrap" the content encryption key. The unwrapping occurs in the vault using the private half of the key, to then enable the content encryption key to decrypt the algorithm.

In some particular embodiments, the system sends algorithm models via an Azure Confidential Computing environment to a data steward's environment. Upon verification, the model and the data entered the Intel SGX sequestered enclave where the model is able to be validated against the protected information, for example PHI, data sets. Throughout the process, the algorithm owner cannot see the data, the data steward cannot see the algorithm model, and the management core can see neither the data nor the model. It should be noted that an Intel SGX enclave is but one substantiation of a hardware enabled trusted execution environment. Other hardware and/or software enabled trusted execution environments may be readily employed in other embodiments.

The data steward uploads encrypted data to their cloud environment using an encrypted connection that terminates inside an Intel SGX-sequestered enclave. In some embodiments, the encrypted data may go into Blob storage prior to terminus in the sequestered enclave, where it is pulled upon as needed. Then, the algorithm developer submits an encrypted, containerized AI model which also terminates into an Intel SGX-sequestered enclave. In some specific embodiments, a key management system in the management core enables the containers to authenticate and then run the model on the data within the enclave. In alternate embodiments, where distributed keys are utilized, there is no need for a key management system. Rather in such embodiments, the system is fully distributed among the parties, as shall be described in greater detail below. The data steward never sees the algorithm inside the container and the data is never visible to the algorithm developer. Neither component leaves the enclave. After the model runs, in some embodiments the developer receives a performance report on the values of the algorithm's performance. Finally, the algorithm owner may request that an encrypted artifact containing information about validation results is stored for regulatory compliance purposes and the data and the algorithm are wiped from the system.

Figure 1B:
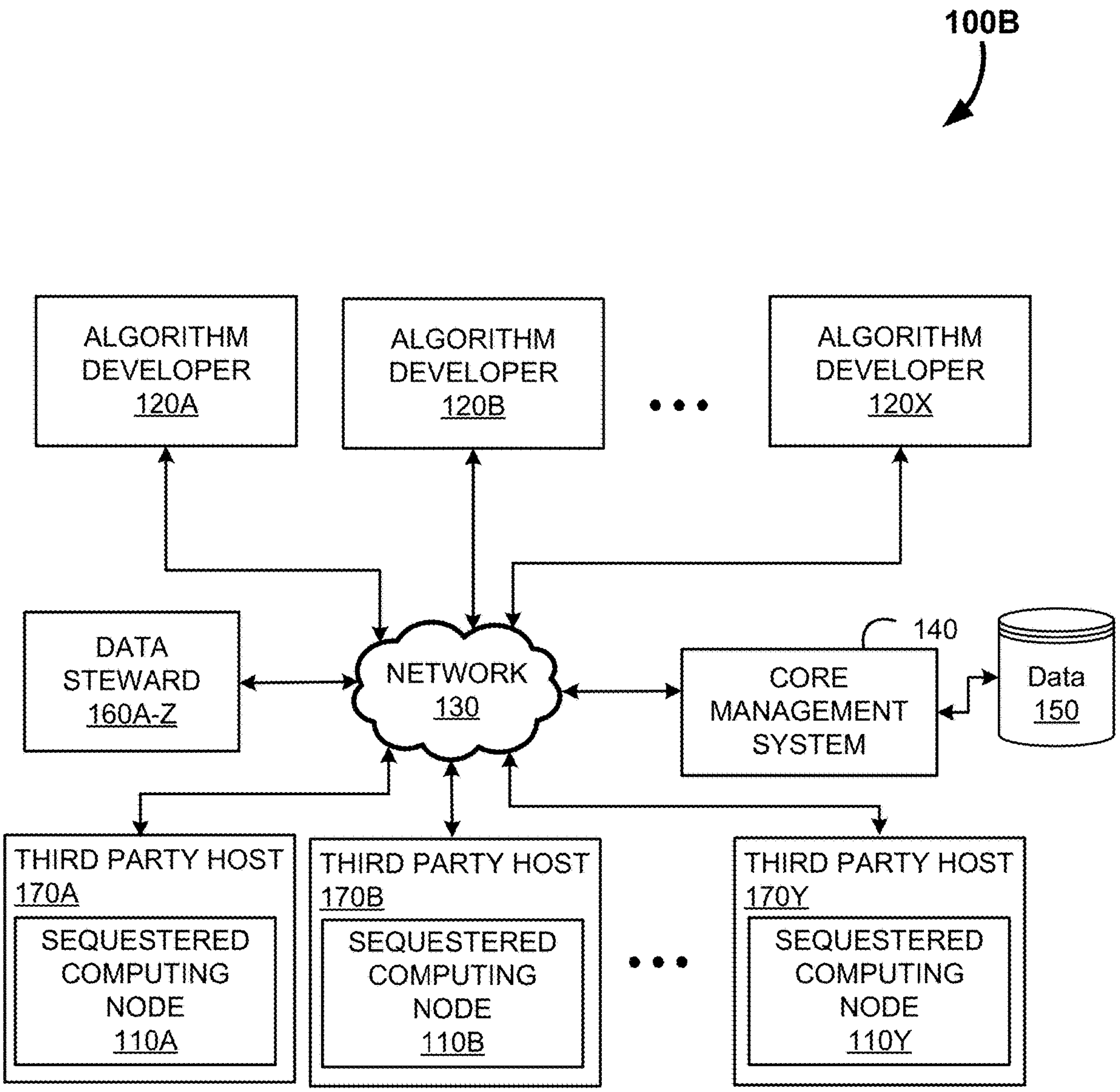

FIG. 1B provides a similar ecosystem 100*b*. This ecosystem also includes one or more algorithm developers 120*a-x*, which generate, encrypt and output their models. The core management system 140 receives these encrypted payloads, and in some embodiments, transforms or augments unencrypted portions of the payloads. The major difference between this substantiation and the prior figure, is that the sequestered computing node(s) 110*a-y* are present within a third-party host 170*a-y*. An example of a third-party host may include an offsite server such as Amazon Web Service (AWS) or similar cloud infrastructure. Other examples can include any network-connected environment, such as traditional data centers. In such situations, the data steward encrypts their dataset(s) and provides them, via the network, to the third party hosted sequestered computing node(s) 110*a-y*. The output of the algorithm running on the dataset is then transferred from the sequestered computing node in the third-party, back via the network to the data steward (or potentially some other recipient).

In some specific embodiments, the system relies on a unique combination of software and hardware available through Azure Confidential Computing. The solution uses virtual machines (VMs) running on specialized Intel processors with Intel Software Guard Extension (SGX), in this embodiment, running in the third-party system. Intel SGX creates sequestered portions of the hardware's processor and memory known as "enclaves" making it impossible to view data or code inside the enclave. Software within the management core handles encryption, key management, and workflows.

In some embodiments, the system may be some hybrid between FIGS. 1A and 1B. For example, some datasets may be processed at local sequestered computing nodes, especially extremely large datasets, and others may be processed at third parties. Such systems provide flexibility based upon computational infrastructure, while still ensuring all data and algorithms remain sequestered and not visible except to their respective owners.

Figure 2:
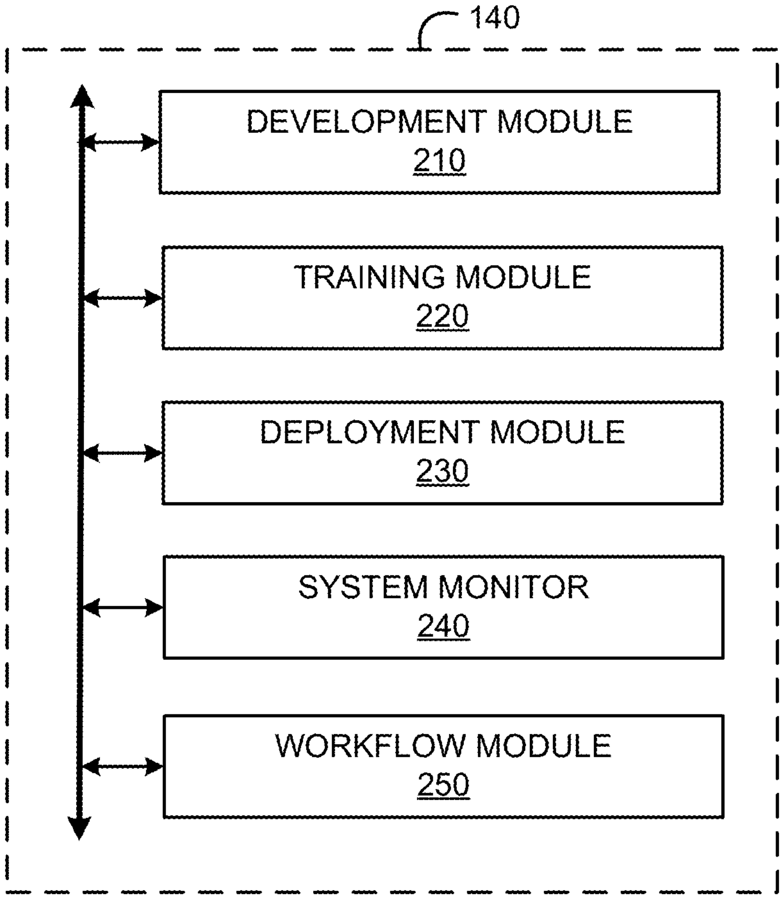
FIG. 2 is an example block diagram showing the core management system, in accordance with some embodiment.

Turning now to FIG. 2, greater detail is provided regarding the core management system 140. The core management system 140 may include a data science development module 210, a data harmonizer workflow creation module 250, a software deployment module 230, a federated master algorithm training module 220, a system monitoring module 240, and a data store comprising global join data 240.

The data science development module 210 may be configured to receive input data requirements from the one or more algorithm developers for the optimization and/or validation of the one or more models. The input data requirements define the objective for data curation, data transformation, and data harmonization workflows. The input data requirements also provide constraints for identifying data assets acceptable for use with the one or more models. The data harmonizer workflow creation module 250 may be configured to manage transformation, harmonization, and annotation protocol development and deployment. The software deployment module 230 may be configured along with the data science development module 210 and the data harmonizer workflow creation module 250 to assess data assets for use with one or more models. This process can be automated or can be an interactive search/query process. The software deployment module 230 may be further configured along with the data science development module 210 to integrate the models into a sequestered capsule computing framework, along with required libraries and resources.

In some embodiments, it is desired to develop a robust, superior algorithm/model that has learned from multiple disjoint private data sets (e.g., clinical and health data) collected by data hosts from sources (e.g., patients). The federated master algorithm training module may be configured to aggregate the learning from the disjoint data sets into a single master algorithm. In different embodiments, the algorithmic methodology for the federated training may be different. For example, sharing of model parameters, ensemble learning, parent-teacher learning on shared data and many other methods may be developed to allow for federated training. The privacy and security requirements, along with commercial considerations such as the determination of how much each data system might be paid for access to data, may determine which federated training methodology is used.

The system monitoring module 240 monitors activity in sequestered computing nodes. Monitored activity can range from operational tracking such as computing workload, error state, and connection status as examples to data science monitoring such as amount of data processed, algorithm convergence status, variations in data characteristics, data errors, algorithm/model performance metrics, and a host of additional metrics, as required by each use case and embodiment.

In some instances, it is desirable to augment private data sets with additional data located at the core management system (join data 150). For example, geolocation air quality data could be joined with geolocation data of patients to ascertain environmental exposures. In certain instances, join data may be transmitted to sequestered computing nodes to be joined with their proprietary datasets during data harmonization or computation.

The sequestered computing nodes may include a harmonizer workflow module 250, harmonized data, a runtime server, a system monitoring module, and a data management module (not shown). The transformation, harmonization, and annotation workflows managed by the data harmonizer workflow creation module may be deployed by and performed in the environment by harmonizer workflow module using transformations and harmonized data. In some instances, the join data may be transmitted to the harmonizer workflow module to be joined with data during data harmonization. The runtime server may be configured to run the private data sets through the algorithm/model.

The system monitoring module monitors activity in the sequestered computing node. Monitored activity may include operational tracking such as algorithm/model intake, workflow configuration, and data host onboarding, as required by each use case and embodiment. The data management module may be configured to import data assets such as private data sets while maintaining the data assets within the pre-exiting infrastructure of the data stewards.

Turning now to FIG. 3, an example of the flow of algorithms and data are provided, generally at 300. The Zero-Trust Encryption System 320 manages the encryption, by an encryption server 323, of all the algorithm developer's 120 software assets 321 in such a way as to prevent exposure of intellectual property (including source or object code) to any outside party, including the entity running the core management system 140 and any affiliates, during storage, transmission and runtime of said encrypted algorithms 325. In this embodiment, the algorithm developer is responsible for encrypting the entire payload 325 of the software using its own encryption keys. Decryption is only ever allowed at runtime in a sequestered capsule computing environment 110.

The core management system 140 receives the encrypted computing assets (algorithms) 325 from the algorithm developer 120. Decryption keys to these assets are not made available to the core management system 140 so that sensitive materials are never visible to it. The core management system 140 distributes these assets 325 to a multitude of data steward nodes 160 where they can be processed further, in combination with private datasets, such as protected health information (PHI) 350.

Each Data Steward Node 160 maintains a sequestered computing node 110 that is responsible for allowing the algorithm developer's encrypted software assets 325 (the "algorithm" or "algo") to compute on a local private dataset 350 that is initially encrypted. Within data steward node 160, one or more local private datasets (not illustrated) is harmonized, transformed, and/or annotated and then this dataset is encrypted by the data steward, into a local dataset 350, for use inside the sequestered computing node 110.

The sequestered computing node 110 receives the encrypted software assets 325 and encrypted data steward dataset(s) 350 and manages their decryption in a way that prevents visibility to any data or code at runtime at the runtime server 330. In different embodiments this can be performed using a variety of secure computing enclave technologies, including but not limited to hardware-based and software-based isolation.

In this present embodiment, the entire algorithm developer software asset payload 325 is encrypted in a way that it can only be decrypted in an approved sequestered computing enclave/node 110. This approach works for sequestered enclave technologies that do not require modification of source code or runtime environments in order to secure the computing space (e.g., software-based secure computing enclaves).

The Algorithm developer 120 generates an algorithm, which is then encrypted and provided as an encrypted algorithm payload 325 to the core management system 140. As discussed previously, the core management system 140 is incapable of decrypting the encrypted algorithm 325. Rather, the core management system 140 controls the routing of the encrypted algorithm 325 and the management of keys. The encrypted algorithm 325 is then provided to the data steward 160 which is then "placed" in the sequestered computing node 110. The data steward 160 is likewise unable to decrypt the encrypted algorithm 325 unless and until it is located within the sequestered computing node 110, in which case the data steward still lacks the ability to access the "inside" of the sequestered computing node 110. As such, the algorithm is never accessible to any entity outside of the algorithm developer.

Likewise, the data steward 160 has access to protected health information and/or other sensitive information. The data steward 160 never is required to transfer this data outside of its ecosystem (an if it is, it may remain in an encrypted state) thus ensuring that the data is always inaccessible by any other party by virtue of it remaining encrypted when accessible by any other party. The sensitive data may be encrypted (or remain in the clear) as it is also transferred into the sequestered computing node 110. This data store is made accessible to the runtime server 330 also located "inside" the sequestered computing node 110. The runtime server 330 decrypts the encrypted algorithm 325 to yield the underlying algorithm model. This algorithm may then use the data store to generate inferences regarding the date contained in the data store (not illustrated). These inferences have value for the data steward 110 as well as other interested parties and may be outputted to the data steward (or other interested parties such as researchers or regulators) for consumption. The runtime server 330 may likewise engage in training activities.

The runtime server 330 may also perform a number of other operations, such as the generation of a performance model or the like. The performance model is a regression model generated based upon the inferences derived from the algorithm. The performance model provides data regarding the performance of the algorithm based upon the various inputs. The performance model may model for any of algorithm accuracy, F1 score, precision, recall, dice score, ROC (receiver operator characteristic) curve/area, log loss, Jaccard index, error, $R^2$, by some combination thereof, or by any other suitable metric.

Once the algorithm developer 120 receives the performance model it may be decrypted, and leveraged to validate the algorithm and, importantly, may be leveraged to actively train the algorithm in the future. This may occur by identifying regions of the performance model that have lower performance ratings and identify attributes/variables in the datasets that correspond to these poorer performing model segments. The system then incorporates human feedback when such variables are present in a dataset to assist in generating a gold standard training set for these variable combinations. The performance model may then be trained based upon these gold standard training sets. Even without the generation of additional gold standard data, investigation of poorer performing model segments enables changes to the functional form of the model and testing for better performance. It is likewise possible that the inclusion of additional variables by the model allows for the distinction of attributes of a patient population. This is identified by areas of the model that has a lower performance which indicates that there is a fundamental issue with the model. An example is that a model operates well (has higher performance) for male patients as compared to female patients. This may indicate that different model mechanics may be required for female patient populations.

Figure 4:
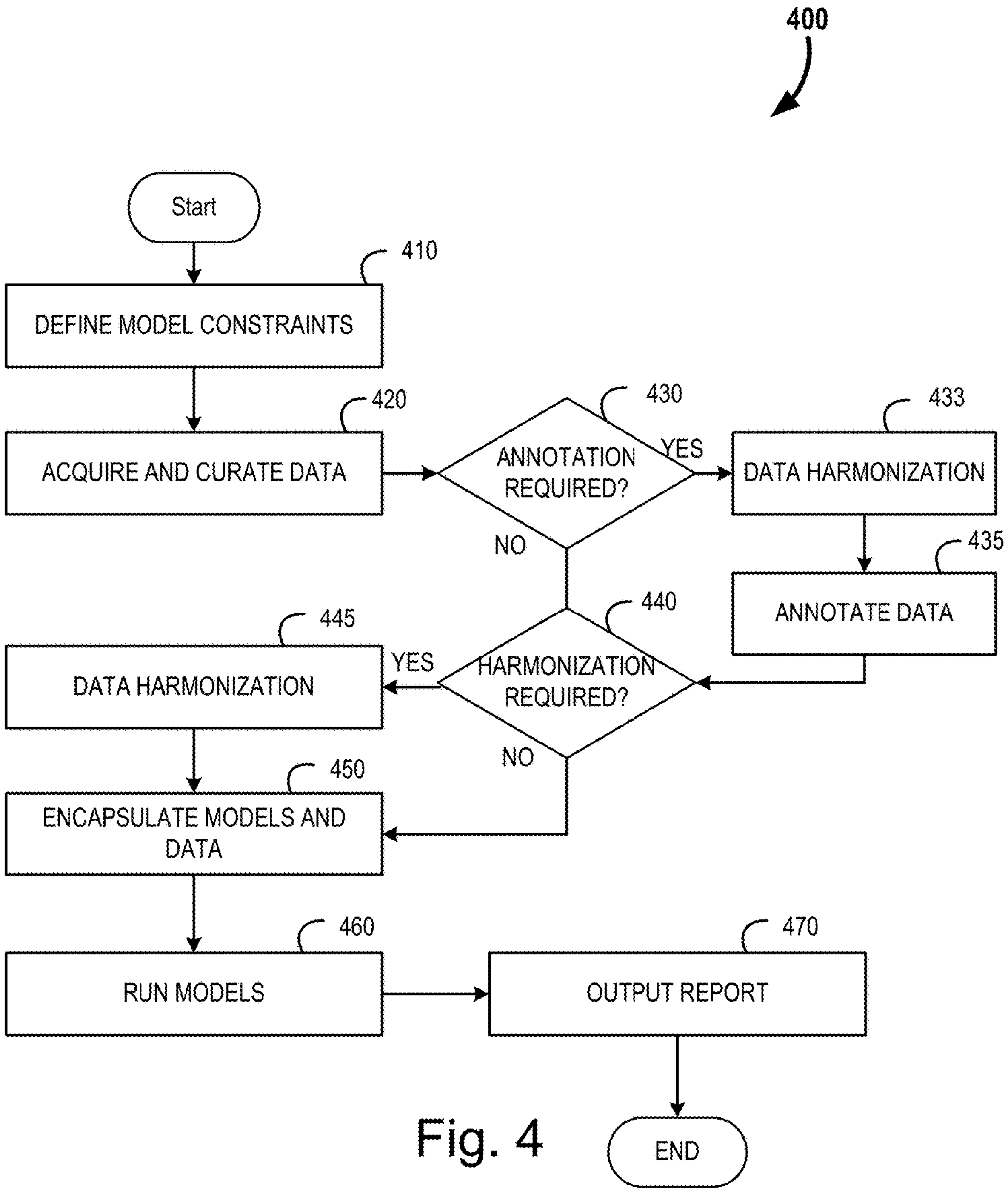
FIG. 4 is a flowchart for an example process for the operation of the confidential computing data processing system, in accordance with some embodiment.

Turning to FIG. 4, one embodiment of the process for deployment and running of algorithms within the sequestered computing nodes is illustrated, at 400. Initially the algorithm developer provides the algorithm to the system using whichever process they locally employ. For example, at least one algorithm/model is generated by the algorithm developer using their own development environment, tools, and seed data sets (e.g., training/testing data sets). In some embodiments, the algorithms may be trained on external datasets instead, as will be discussed further below. The algorithm developer provides constraints (at 410) for the optimization and/or validation of the algorithm(s). Constraints may include any of the following: (i) training constraints, (ii) data preparation constraints, and (iii) validation constraints. These constraints define objectives for the optimization and/or validation of the algorithm(s) including data preparation (e.g., data curation, data transformation, data harmonization, and data annotation), model training, model validation, and reporting.

In some embodiments, the training constraints may include, but are not limited to, at least one of the following: hyperparameters, regularization criteria, convergence criteria, algorithm termination criteria, training/validation/test data splits defined for use in algorithm(s), and training/testing report requirements. A model hyper parameter is a configuration that is external to the model, and which value cannot be estimated from data. The hyperparameters are settings that may be tuned or optimized to control the behavior of a ML or AI algorithm and help estimate or learn model parameters.

Regularization constrains the coefficient estimates towards zero. This discourages the learning of a more complex model in order to avoid the risk of overfitting. Regularization, significantly reduces the variance of the model, without a substantial increase in its bias. The convergence criterion is used to verify the convergence of a sequence (e.g., the convergence of one or more weights after a number of iterations). The algorithm termination criteria define parameters to determine whether a model has achieved sufficient training. Because algorithm training is an iterative optimization process, the training algorithm may perform the following steps multiple times. In general, termination criteria may include performance objectives for the algorithm, typically defined as a minimum amount of performance improvement per iteration or set of iterations.

The training/testing report may include criteria that the algorithm developer has an interest in observing from the training, optimization, and/or testing of the one or more models. In some instances, the constraints for the metrics and criteria are selected to illustrate the performance of the models. For example, the metrics and criteria such as mean percentage error may provide information on bias, variance, and other errors that may occur when finalizing a model such as vanishing or exploding gradients. Bias is an error in the learning algorithm. When there is high bias, the learning algorithm is unable to learn relevant details in the data. Variance is an error in the learning algorithm, when the learning algorithm tries to over-learn from the dataset or tries to fit the training data as closely as possible. Further, common error metrics such as mean percentage error and R2 score are not always indicative of accuracy of a model, and thus the algorithm developer may want to define additional metrics and criteria for a more in depth look at accuracy of the model.

Figure 5:
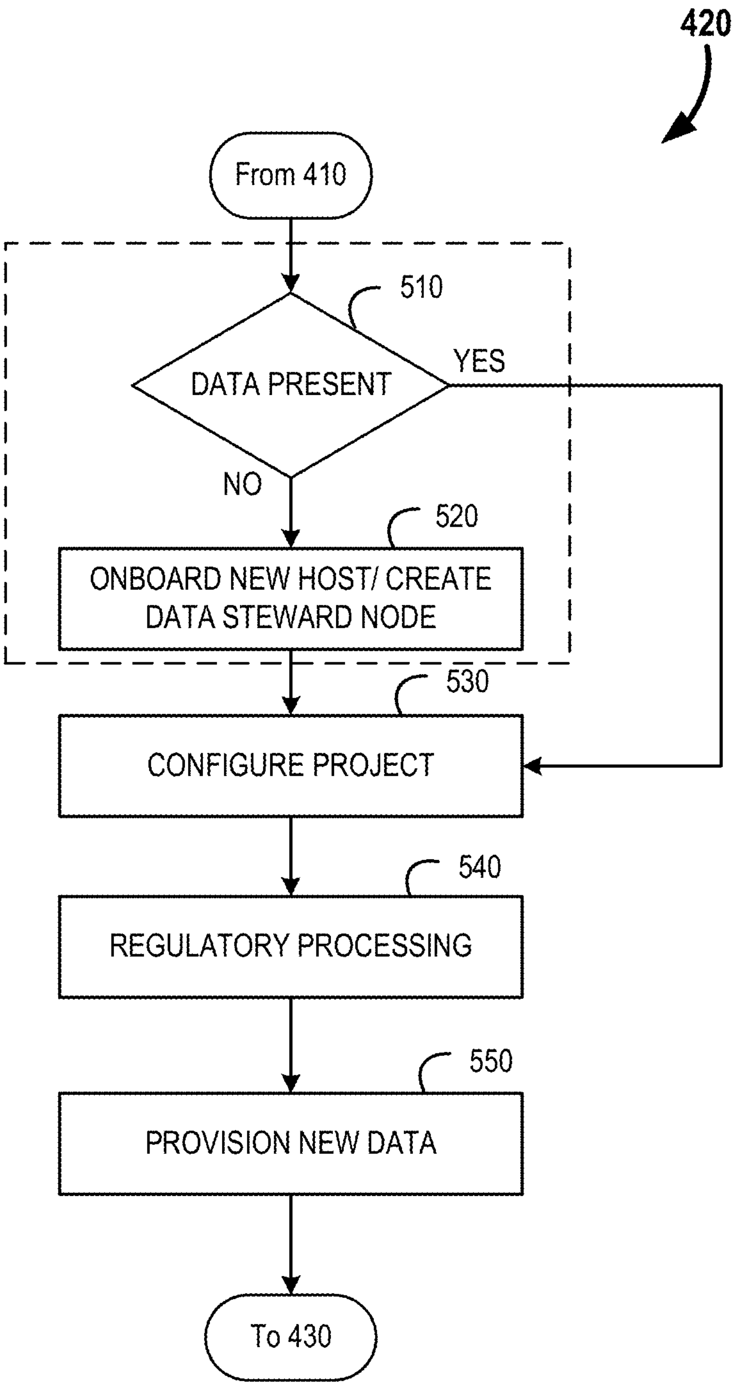
FIG. 5 a flowchart for an example process of acquiring and curating data, in accordance with some embodiment.

Next, data assets that will be subjected to the algorithm(s) are identified, acquired, and curated (at 420). FIG. 5 provides greater detail of this acquisition and curation of the data. Often, the data may include healthcare related data (PHI). Initially, there is a query if data is present (at 510). The identification process may be performed automatically by the platform running the queries for data assets (e.g., running queries on the provisioned data stores using the data indices) using the input data requirements as the search terms and/or filters. Alternatively, this process may be performed using an interactive process, for example, the algorithm developer may provide search terms and/or filters to the platform. The platform may formulate questions to obtain additional information, the algorithm developer may provide the additional information, and the platform may run queries for the data assets (e.g., running queries on databases of the one or more data hosts or web crawling to identify data hosts that may have data assets) using the search terms, filters, and/or additional information. In either instance, the identifying is performed using differential privacy for sharing information within the data assets by describing patterns of groups within the data assets while withholding private information about individuals in the data assets.

Figure 6:
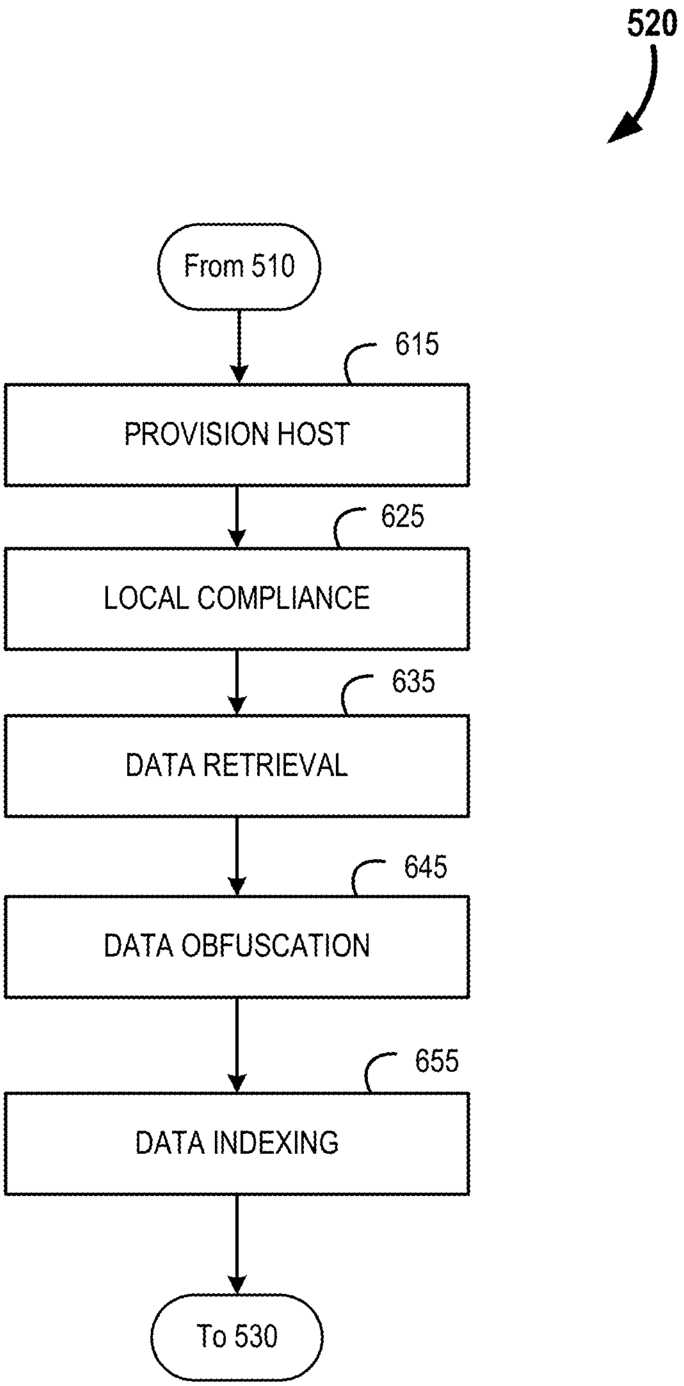
FIG. 6 a flowchart for an example process of onboarding a new host data steward, in accordance with some embodiment.

If the assets are not available, the process generates a new data steward node (at 520). The data query and onboarding activity (surrounded by a dotted line) is illustrated in this process flow of acquiring the data; however, it should be realized that these steps may be performed any time prior to model and data encapsulation (step 450 in FIG. 6). Onboarding/creation of a new data steward node is shown in greater detail in relation to FIG. 6. In this example process a data host compute and storage infrastructure (e.g., a sequestered computing node as described with respect to FIGS. 1A-5) is provisioned (at 615) within the infrastructure of the data steward. In some instances, the provisioning includes deployment of encapsulated algorithms in the infrastructure, deployment of a physical computing device with appropriately provisioned hardware and software in the infrastructure, deployment of storage (physical data stores or cloud-based storage), or deployment on public or private cloud infrastructure accessible via the infrastructure, etc.

Next, governance and compliance requirements are performed (at 625). In some instances, the governance and compliance requirements include getting clearance from an institutional review board, and/or review and approval of compliance of any project being performed by the platform and/or the platform itself under governing law such as the Health Insurance Portability and Accountability Act (HIPAA). Subsequently, the data assets that the data steward desires to be made available for optimization and/or validation of algorithm(s) are retrieved (at 635). In some instances, the data assets may be transferred from existing storage locations and formats to provisioned storage (physical data stores or cloud-based storage) for use by the sequestered computing node (curated into one or more data stores). The data assets may then be obfuscated (at 645). Data obfuscation is a process that includes data encryption or tokenization, as discussed in much greater detail below. Lastly, the data assets may be indexed (at 655). Data indexing allows queries to retrieve data from a database in an efficient manner. The indexes may be related to specific tables and may be comprised of one or more keys or values to be looked up in the index (e.g., the keys may be based on a data table's columns or rows).

Returning to FIG. 5, after the creation of the new data steward, the project may be configured (at 530). In some instances, the data steward computer and storage infrastructure is configured to handle a new project with the identified data assets. In some instances, the configuration is performed similarly to the process described of FIG. 6. Next, regulatory approvals (e.g., IRB and other data governance processes) are completed and documented (at 540). Lastly, the new data is provisioned (at 550). In some instances, the data storage provisioning includes identification and provisioning of a new logical data storage location, along with creation of an appropriate data storage and query structure.

Returning now to FIG. 4, after the data is acquired and configured, a query is performed if there is a need for data annotation (at 430). If so, the data is initially harmonized (at 433) and then annotated (at 435). Data harmonization is the process of collecting data sets of differing file formats, naming conventions, and columns, and transforming it into a cohesive data set. The annotation is performed by the data steward in the sequestered computing node. A key principle to the transformation and annotation processes is that the platform facilitates a variety of processes to apply and refine data cleaning and transformation algorithms, while preserving the privacy of the data assets, all without requiring data to be moved outside of the technical purview of the data steward.

Figure 7:
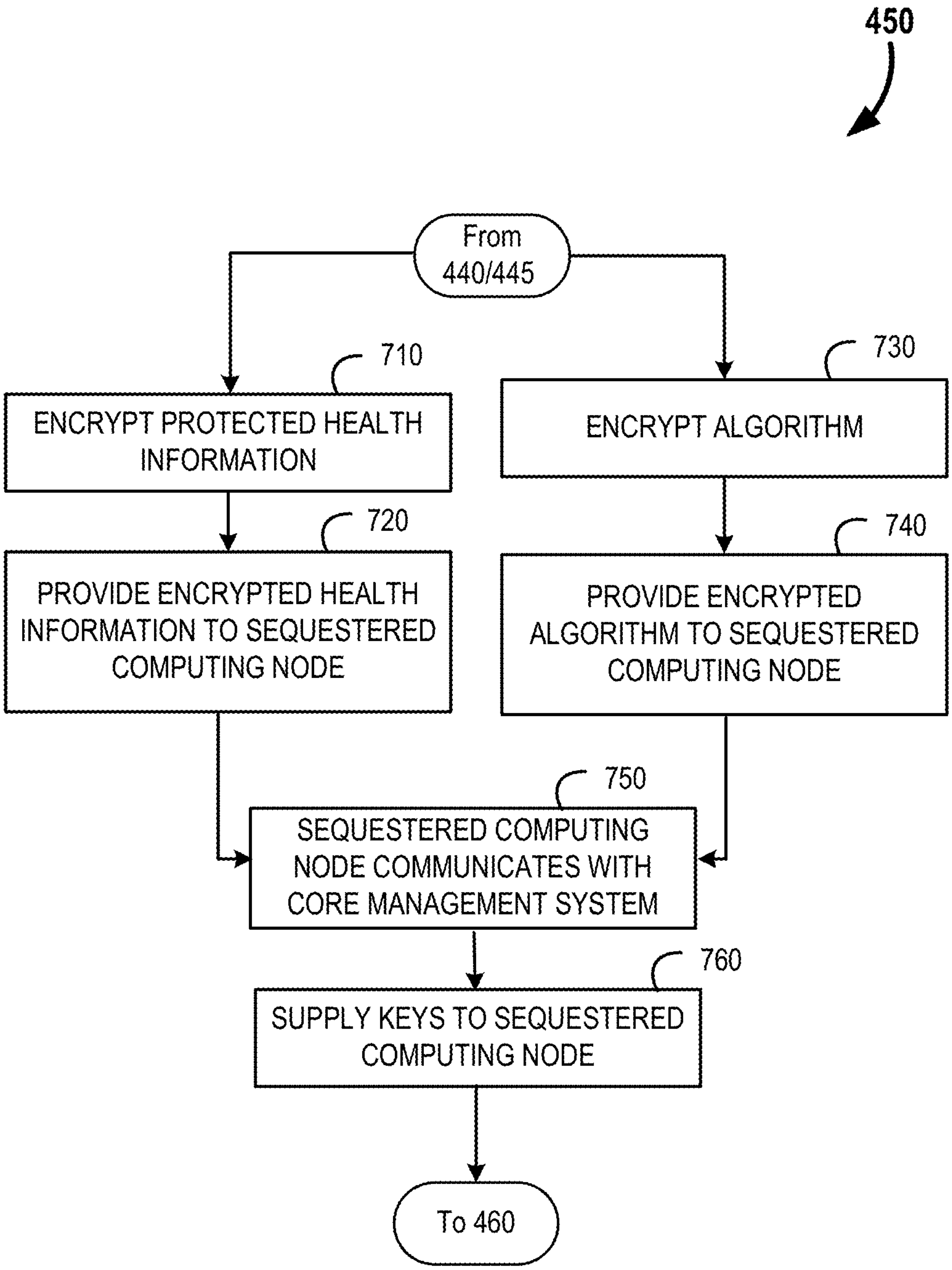
FIG. 7 is a flowchart for an example process of encapsulating the algorithm and data, in accordance with some embodiment.

After annotation, or if annotation was not required, another query determines if additional data harmonization is needed (at 440). If so, then there is another harmonization step (at 445) that occurs in a manner similar to that disclosed above. After harmonization, or if harmonization isn't needed, the models and data are encapsulated (at 450). Data and model encapsulation is described in greater detail in relation to FIG. 7. In the encapsulation process the protected data, and the algorithm are each encrypted (at 710 and 730 respectively). In some embodiments, the data is encrypted either using traditional encryption algorithms (e.g., RSA) or homomorphic encryption.

Next the encrypted data and encrypted algorithm are provided to the sequestered computing node (at 720 and 740 respectively). There processes of encryption and providing the encrypted payloads to the sequestered computing nodes may be performed asynchronously, or in parallel. Subsequently, the sequestered computing node may phone home to the core management node (at 750) requesting the keys needed. These keys are then also supplied to the sequestered computing node (at 760), thereby allowing the decryption of the assets.

Returning again to FIG. 4, once the assets are all within the sequestered computing node, they may be decrypted and the algorithm may run against the dataset (at 460). The results from such runtime may be outputted as a report (at 470) for downstream consumption.

Figure 8:
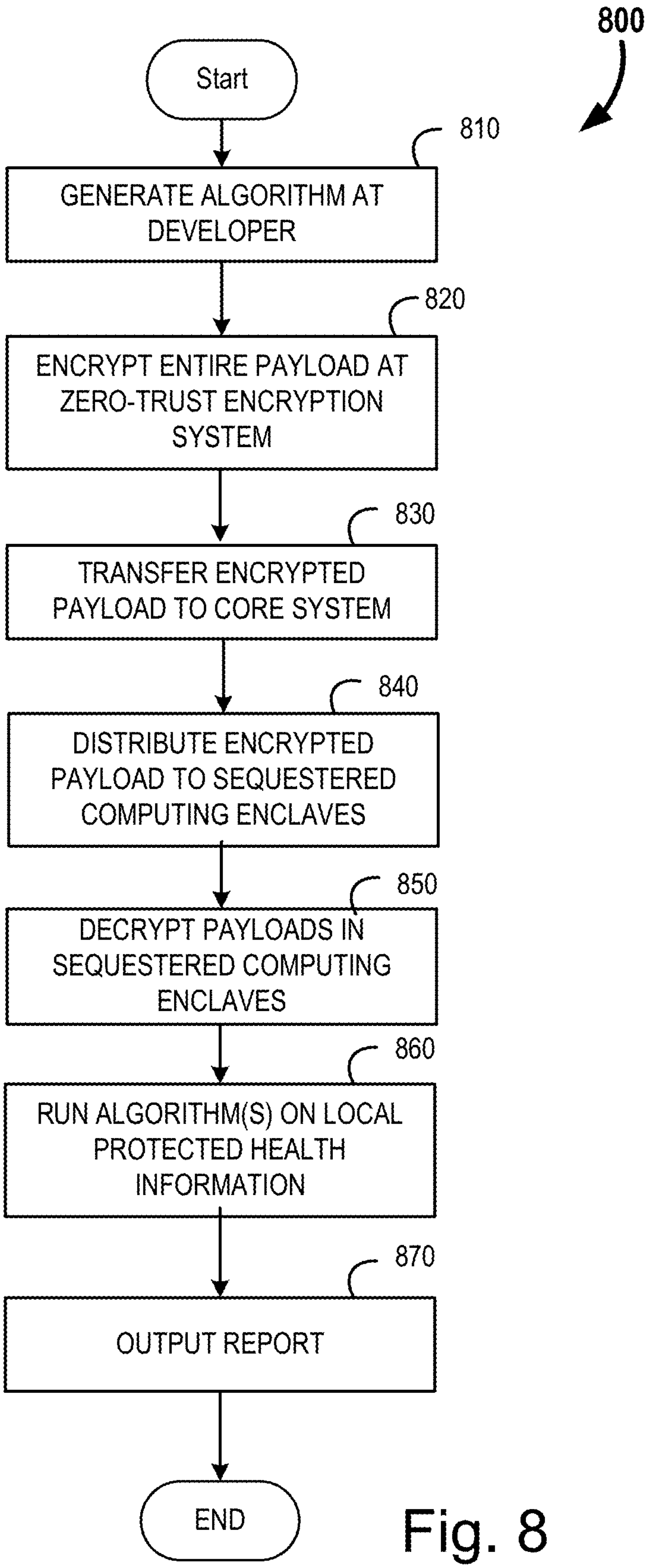
FIG. 8 is a flowchart for an example process of algorithm encryption and handling, in accordance with some embodiment.

Turning now to FIG. 8, a first embodiment of the system for confidential computing processing of the data assets by the algorithm is provided, at 800. In this example process, the algorithm is initially generated by the algorithm developer (at 810) in a manner similar to that described previously. The entire algorithm, including its container, is then encrypted (at 820), using a public key, by the encryption server within the algorithm developer's infrastructure. The entire encrypted payload is provided to the core management system (at 830). The core management system then distributes the encrypted payload to the sequestered computing enclaves (at 840).

Likewise, the data steward collects the data assets desired for processing by the algorithm. This data is also provided to the sequestered computing node. In some embodiments, this data may also be encrypted. The sequestered computing node then contacts the core management system for the keys. The system relies upon public-private key methodologies for the decryption of the algorithm, and possibly the data (at 850).

After decryption within the sequestered computing node, the algorithm(s) are run (at 860) against the protected health information (or other sensitive information based upon the given use case). The results are then output (at 870) to the appropriate downstream audience (generally the data steward or algorithm developer, but may include public health agencies or other interested parties).

Figure 9:
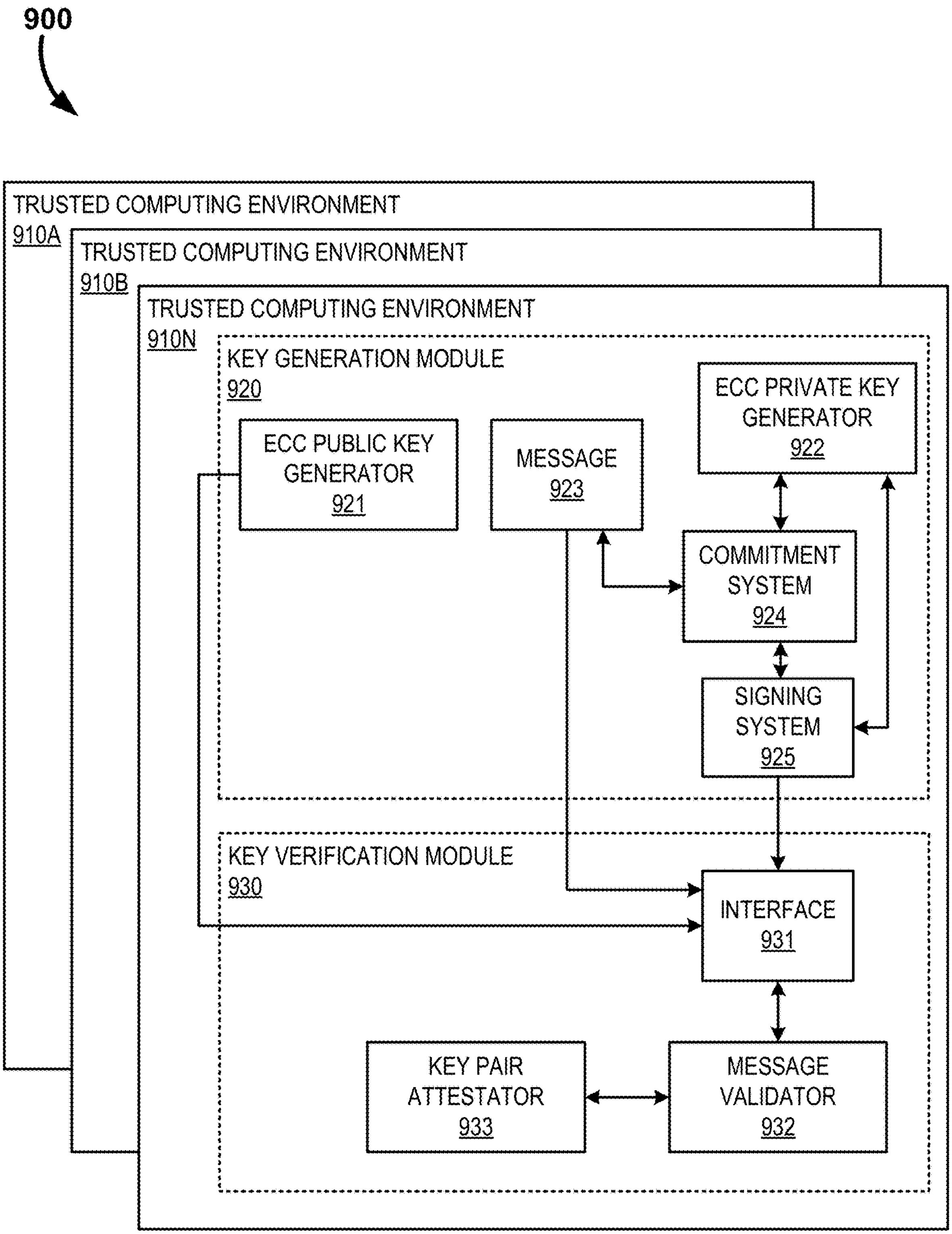
FIG. 9 is an example block diagram showing key generation and validation, in accordance with some embodiment.

Turning now to FIG. 9, specifics of distributed key generation and verification for controlled access to content based upon a full or partial quorum is provided. Here, as seen generally at 900, is a plurality of trusted computing environments 910*a-n*, each completing key generation and verification activities. In a classic use case the trusted computing environments 910*a-n* include the algorithm developer, the core management system and one or more data stewards. In some embodiments, the trusted computing environments 910*a-n* are sequestered computing nodes operating within each of these entities. Of course, in alternate embodiments, the trusted computing environments 910*a-n* may comprise different sets of parties, including different combinations of data stewards, data stewards and downstream parties (e.g., regulators and/or researchers), data stewards and the core managements system, or any combination where each party involved is desired to provide key fragments (or "shards") to the distributed key, and therefore be party to determining if/when/how the end content becomes accessible.

In this illustration, the trusted computing environments 910*a-n* each contain two functional systems, a key generation system 920 and a key verification system 930. The Key generation system utilizes elliptical curve cryptography (ECC) techniques to generate a public key and a private key, at an ECC public key generator 921 and ECC private key generator 922, respectively. In some particular embodiments, an elliptic curve digital signature algorithm (ECDSA) may be employed in key generation. ECC may be leveraged due to the additive properties present in this form of cryptography. With ECC public keys may be added together to generate an aggregate group public key which will correspond to a simply added group of private keys in the enclave. In some specific examples, ECC curves that sport a bilinear pairing may be particularly useful in the following systems and methods.

The ECC generated private key is then combined in a hash with a message 923 at a commitment system 924. In some cases, the message is a timestamp, but can be any other token. The resulting private key hash is then provided, along with the original private key, to a signing system 925, which adds a signature.

The public key, the original message 923 and the commitment are all provided to the interface 931 in the key verification module 930 for each of the trusted computing environments 910*a-n*. In this manner, the key can be verified for each trusted computing environment 910*a-n* by all other trusted computing environments 910*a-n*. The message validator 932 validates the message and a key pair attestation module 933 proves that the counterparties have legitimate key pairs, random blinding factors and commitments. In this manner, each trusted computing environments 910*a-n* is capable of confirming the authenticity that each other trusted computing environments 910*a-n* have legitimate key pairs.

Figure 10:
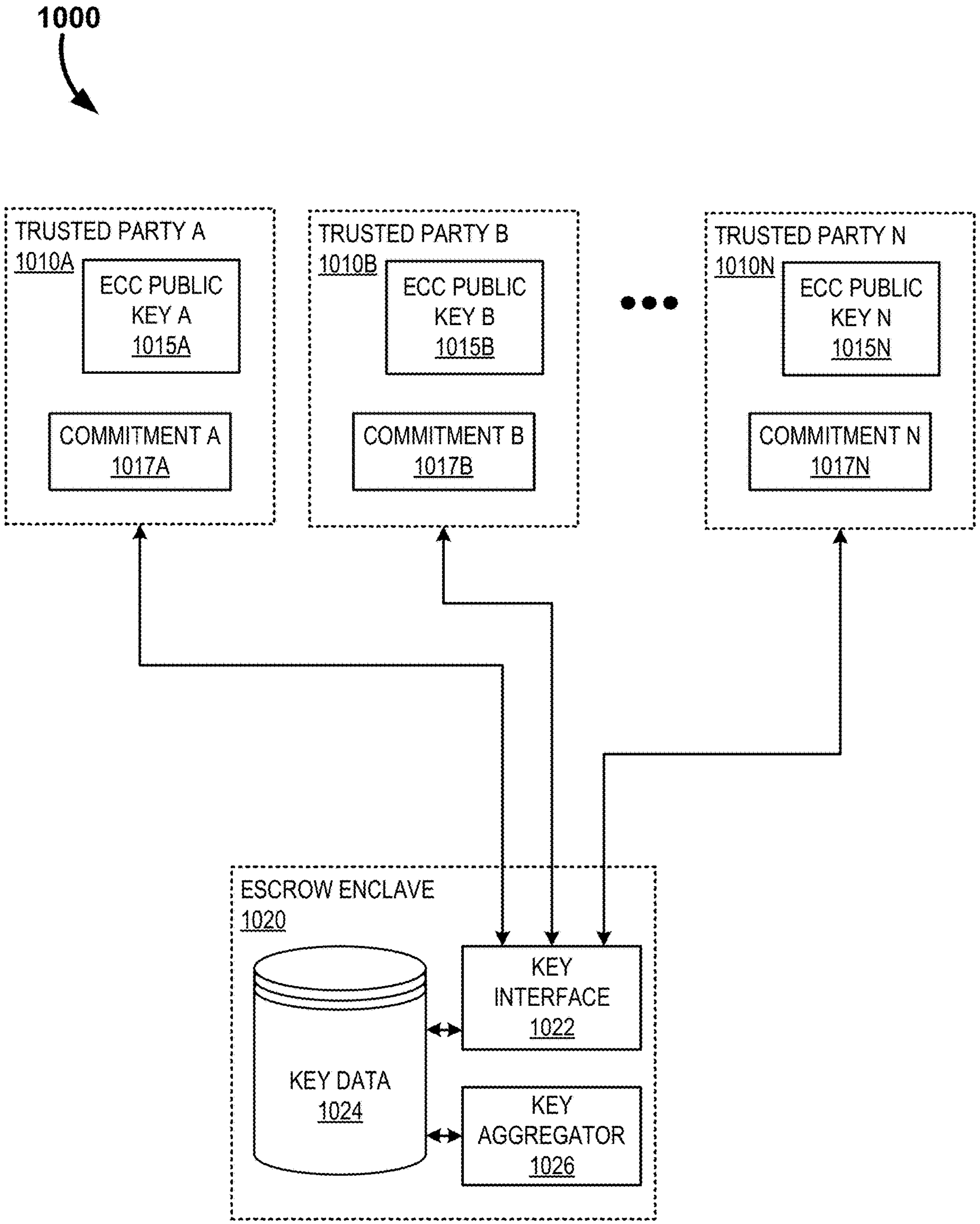
FIG. 10 is an example block diagram showing key aggregation, in accordance with some embodiment.

After key generation, the public keys are integrated with one another in an aggregation process, as seen generally at 1000 in relation to FIG. 10. During the distribution of public keys, each party produces a commitment to a shamir secret sharing polynomial. These commitments ensure that there are no bad actors gaming the secret sharing of keys. The commitment process is a more rigorous way of demanding clarity on pre-created-key steps, and is added as an additional step to the core signature process.

During the initialization the following is applied:

$$f_j(x) = \sum_{i=0}^{t} a_i x^i \quad \text{Equation 1}$$

Where f is the shared secret;
where t is the threshold of the parties;
where j is the party; and
where $a_i$ is a random polynomial; then $$C_i = a_i G + r_i H \quad \text{Equation 2}$$

Where G is a well known generation on an elliptic curve;
Where C is the commitment for party i;
where H is another point on the ECC curve;
where $[r_i]$ is a random blinding factor for commitment verification; and
where $[S_i]$ is the party secret.

After the commitments have been distributed, each party may distribute their public keys and shares of their secret key. Thresholding in the shamir secret sharing portion of this method can be adjusted. This allows each party to select polynomials in such a way that the curve can be interpolated with fewer participants. In many embodiments, it is desirable for the core management system to be necessary as a attesting party regardless of the number of parties needed to compute their LaGrange interpolation. Thus, by way of example, in a situation with four parties, and only three needed to meet the interpolation threshold, there is still a mathematical process where a particular entity (e.g., the core management system) remains a necessary party even if there are sufficient other parties present to meet the threshold.

In yet another situation, the core management system is not critical per se, but rather the enclave itself is a participant in the process. In such situations the enclave, when preset, provides an attestation measurement, a signature of its downstream keys, and then it operates as normal. However, if the enclave is absent, this process does not complete. The parties will demand measurements signed by the enclave, thus preventing the process until an enclave is active for the generation of the participant quorum.

As noted before, there are a plurality of trusted parties trusted 1010*a-n*, each operating in a trusted computing environment. The parties have each generated an ECC public key 1015*a-n*. Each party has likewise generated a commitment 1017*a-n*, as discussed above. Each party validates the commitment 1017*a-n* of the other party before accepting the public key 1015*a-n*. In some embodiments, the validation of the commitments 1017*a-n* is not performed within an enclave. These public keys are collected in a key database 1024 via a key interface 1022 in an escrow enclave 1020. The escrow enclave 1020 may be a sequestered computing node special-built for the purpose of collecting and aggregation the public keys. In some particular embodiments, the escrow enclave may reside within the core management system (a trusted party operating between the algorithm developers and data stewards). The individual keys stored in the key database 1024 may then be aggregated by the key aggregator 1026 and the result may be also stored in the key database/repository 1024. The aggregated key may be supplied back to all or a subset of the trusted parties. This aggregated key is then used by these parties to encrypt data.

In some embodiments, the commitment to the public key is as follows:

$$P_i = s_i G \quad \text{Equation 3}$$

Where P is the public key for party i; then $$C_{p_i} = p_i G + r_i H \quad \text{Equation 4}$$

Where $P_i$ and $C_{pi}$ are provided from party i to all other parties. Likewise, the $r_i$ random blinding factor is also sent to all parties. Each party verifies the public key from each other party. The group public key is computed as:

$$\prod_{1}^{N} p_i \quad \text{Equation 5}$$

Figure 11A:
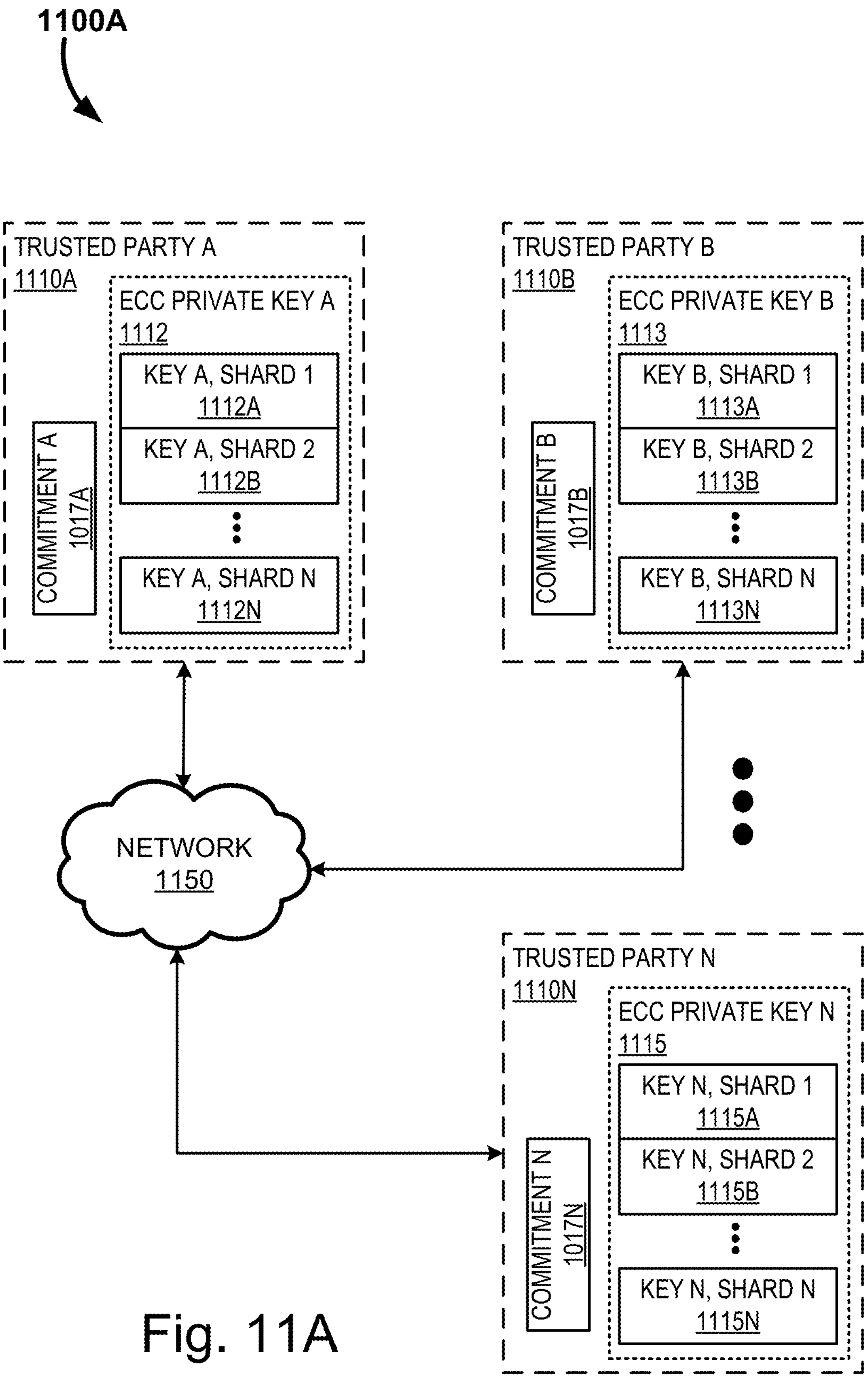
FIGS. 11A and 11B are example block diagrams showing key sharding and reassembly, in accordance with some embodiment.
Figure 11B:
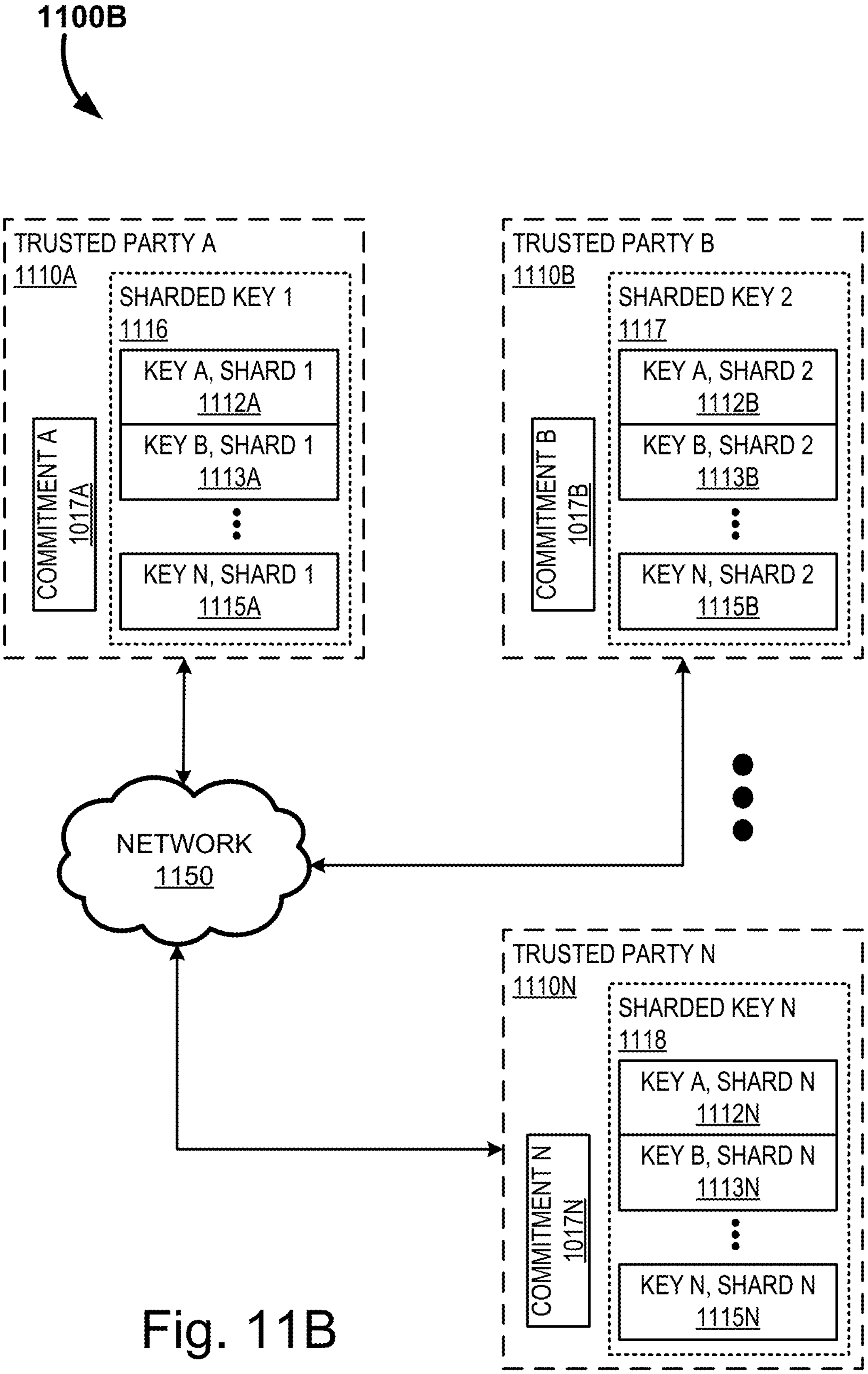

The ECC private keys may likewise be distributed, but unlike the public key which is aggregated and centrally stored, the private keys are fragmented into shards and sent from each party to the other parties for assembly of sharded keys. FIGS. 11A and 11B provide details around this process. In FIG. 11A, as seen generally at 1100A, each trusted party 1110*a-n* includes it's ECC private key 1112, 1113 and 1115 respectively. Each trusted party also includes their commitment 1017*a-n*, which is corresponds to the value of the polynomial. Each party keeps their binding factors for release secret. The trusted parties break their individual ECC private keys into portions (known as shards). Generally, the number of shards the keys are broken into corresponds to the number of parties involved in the transaction. Here, for example, ECC private key A 1112 is split into N shards 1112*a-n* respectively, as there are N parties involved. When only two parties are present, only two shards would be generated. For a thousand parties, a thousand shards would be generated from each key.

As noted before in Equation 1, secret shares are generated by the addition of the random polynomial across each party within the threshold number of parties.

The trusted parties 1110*a-n* are each coupled to one another via one or more networks 1150. The networks may include any combination of wide area networks (WANs), local area networks (LANs), corporate networks, and the like. Often the network 1150 includes at least some component of the Internet and/or cellular networks. The network 1150 enables each of the trusted parties 1110*a-n* to communicate on a peer-to-peer basis to share shards between the given parties. A schema is generated as to which party receives each shard. For example, party B 1110*b* may receive the shard 2 from each party. Party N 1110*n* may receive, in this example, shard N from each party. As long as all parties know which shard number to provide each other party the exact shard number to party isn't critical for operations.

After shard sharing is completed, each party results in a sharded key, as seen in FIG. 11B at 1100B. Again, we see the trusted parties 1110*a-n* coupled to one another via the network 1150. But now, each trusted party 1110*a-n* includes a unique sharded key 1116, 1117 and 1118 respectively. Each sharded key is comprised of a single shard from each of the trusted parties 1110*a-n*. For example, sharded key 1 1116, stored in trusted party A 1110*a*, is comprised of shard 1 from each of the trusted parties 1110*a-n*. In particular it is comprised of shard 1 from keys A-N 1112*a*, 1113*a* and 1115*n*, respectively. As such, each sharded key in each trusted party 1110*a-n* is unique to the party, and includes secret information from each of the other trusted parties 1110*a-n*.

Figure 12:
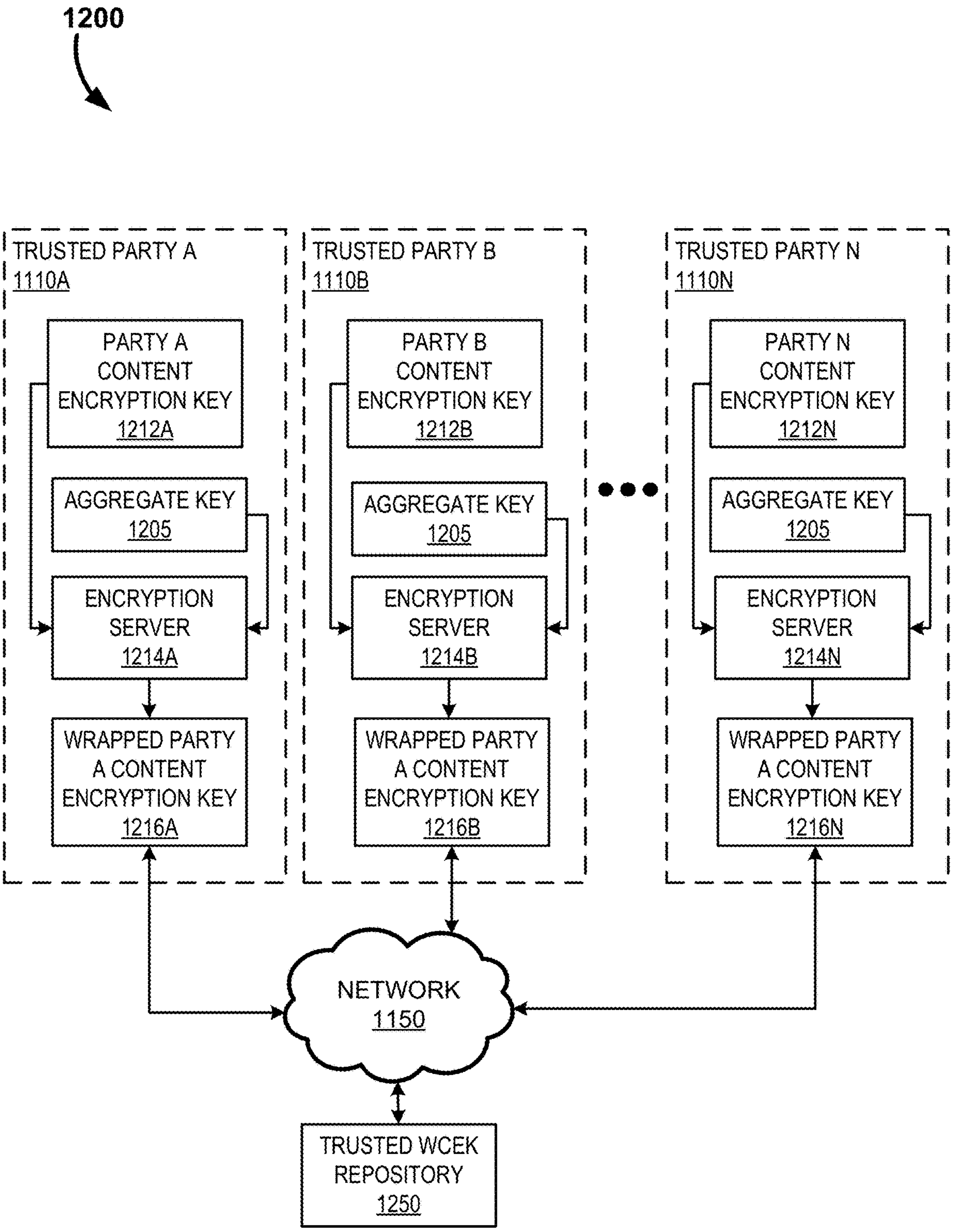
FIG. 12 is an example block diagram showing wrapping parties content encryption keys and aggregation in a repository, in accordance with some embodiment.

After each party has the sharded keys, the process of wrapping the content encryption keys for each party can be performed, as seen generally at 1200 of FIG. 12. Again, each trusted party A-N 1110*a-n* is illustrated. Each party has a content encryption key 1212*a-n* that is unique to the given party 1110*a-n*, respectively. Each party 1110*a-n* also has access to the aggregate public key 1205 that was generated in reference to FIG. 10 and previously stored in the key repository of the escrow enclave. The content encryption key 1212*a-n* may be provided to an encryption server 1214*a-n* at each trusted party 1110*a-n*, and is then wrapped (encrypted) using the aggregate key 1205. This results in a unique wrapped content encryption key (WCEK) for each respective party 1216*a-n*. This may be provided through the network 1150 to a trusted WCEK repository 1250. In some embodiments, this WCEK repository 1250 may reside in the core management system, which is generally viewed by most other parties as a "neutral" third party and is trusted to maintain such data.

Note, that in this figure all of the N parties are illustrated as engaging in the wrapping of the content encryption key. It should be noted that, in some embodiments, only a subset of the parties may desire to have content encryption keys wrapped.

Figure 13:
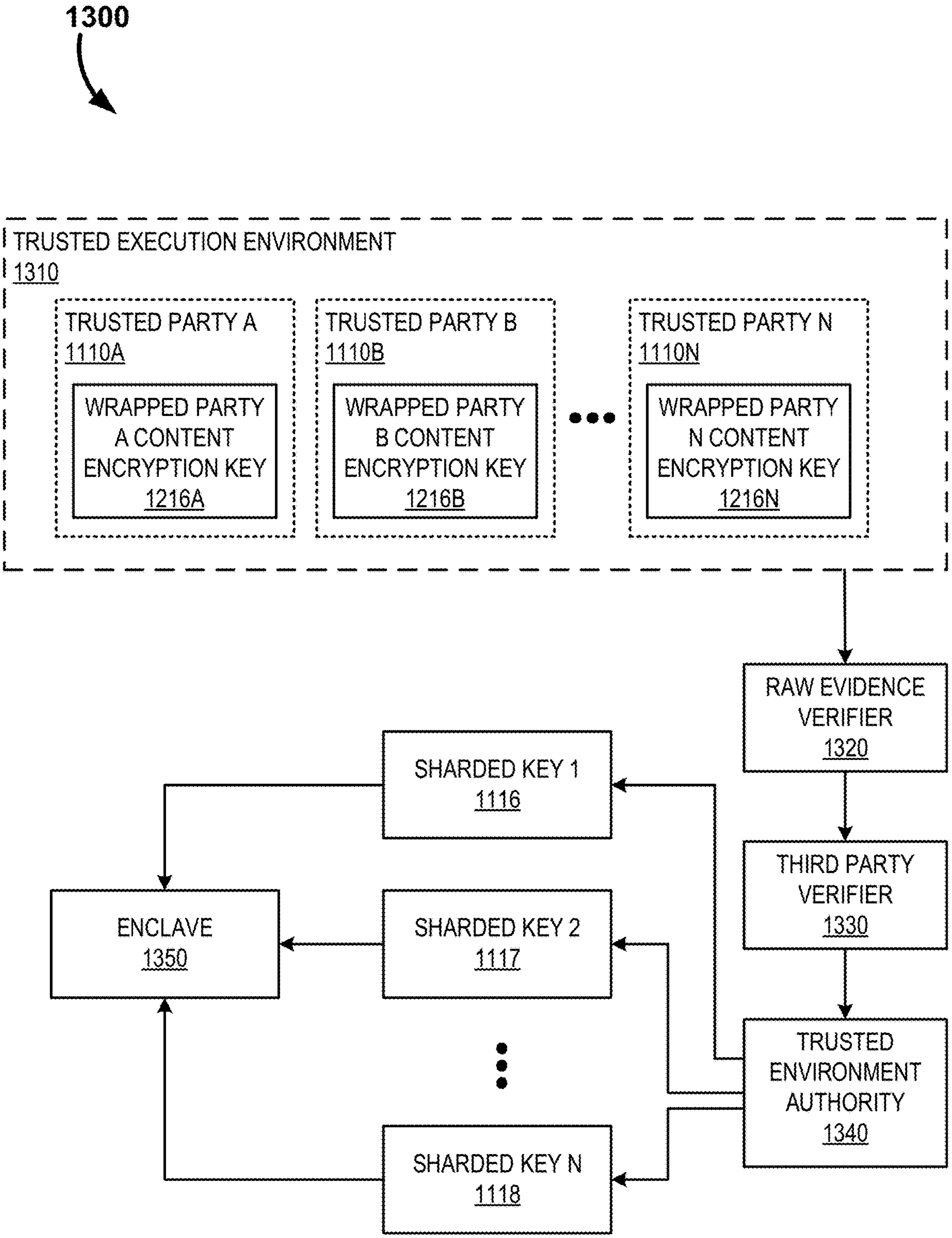
FIG. 13 is an example block diagram showing attestation for release of sharded keys, in accordance with some embodiment.

Turning now to FIG. 13, an example diagram is provided for the release of the sharded keys to each of the trusted parties, as shown generally at 1300. In this example, each of the trusted parties A-N 1110*a-n* are operating in a trusted execution environment 1310. By operating in a trusted execution environment 1310, it requires that all parties are operating in sequestered computing nodes, as previously noted, and are taking the precautions that any runtime activities are inaccessible outside of these sequestered environments.

Each trusted party 1110*a-n* includes their individual wrapped content encryption key 1216*a-n*. Raw evidence is provided to an internal verifier 1320. In some embodiments the raw evidence verifier 1320 is part of the core management system. The raw evidence verifier 1320 consumes this evidence. This results in another set of refined evidence that can be provided to a trusted environment authority 1340. This authority 1340 may be external to the trusted execution environment 1310. For example, this authority 1340 may include some third party. The authority 1340 verifies the fidelity of the trusted execution environment 1310.

Once the authority 1340 is sufficiently convinced that the trusted environment has been attested to, it may instruct the appropriate authority (again, generally the core management system) to release, or to instruct the other parties to release their given sharded keys 116, 117 and 118 respectively. These sharded keys are provided back to an enclave 1350, which in some embodiments may be the trusted execution environment 1310. Each party will share their random blinding values, their commitments as received, and their shards. This will allow the enclave to validate shard values.

Figure 14:
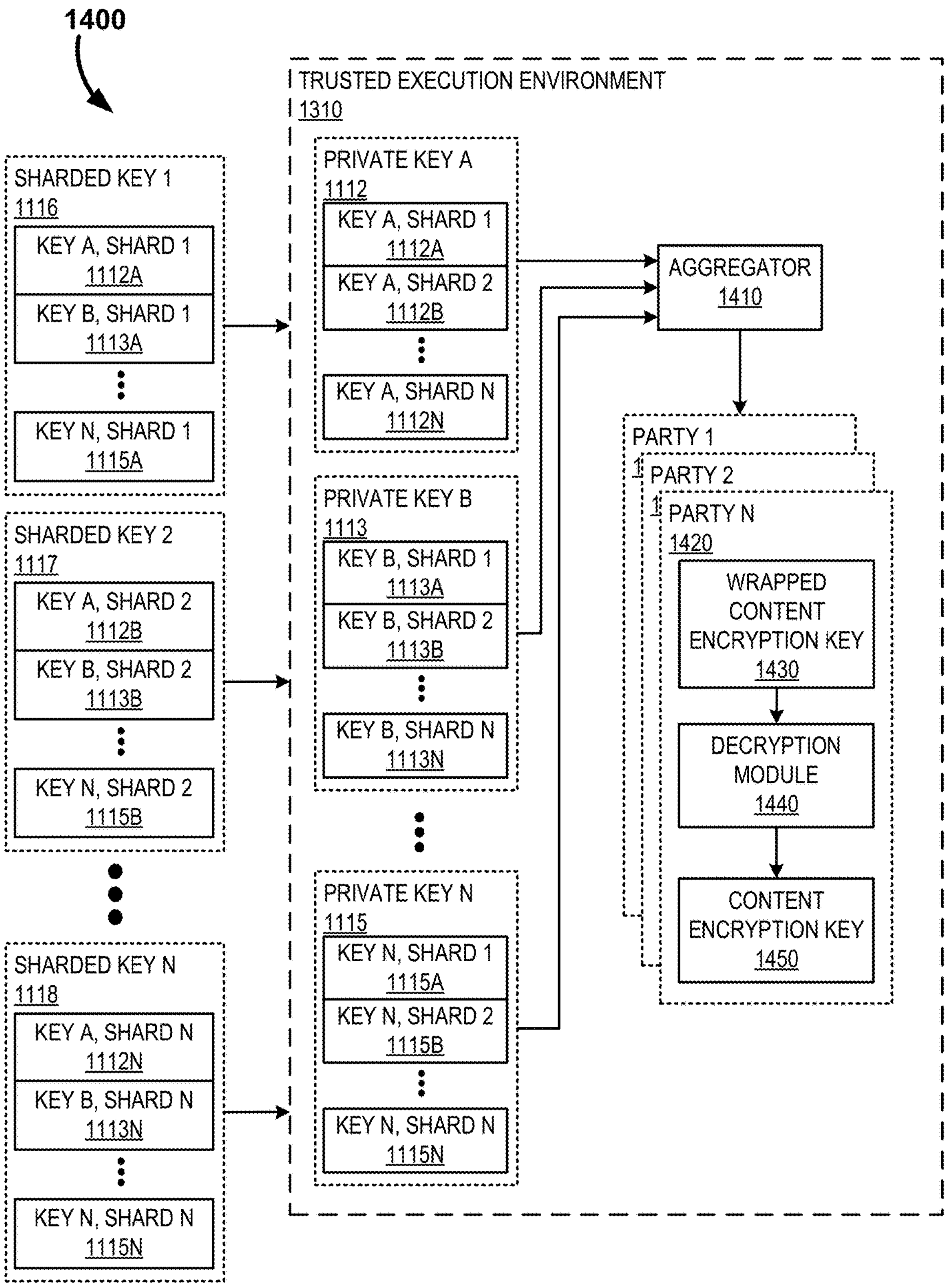
FIG. 14 is an example block diagram showing content encryption key decryption by aggregated sharded keys, in accordance with some embodiment.
Figure 15:
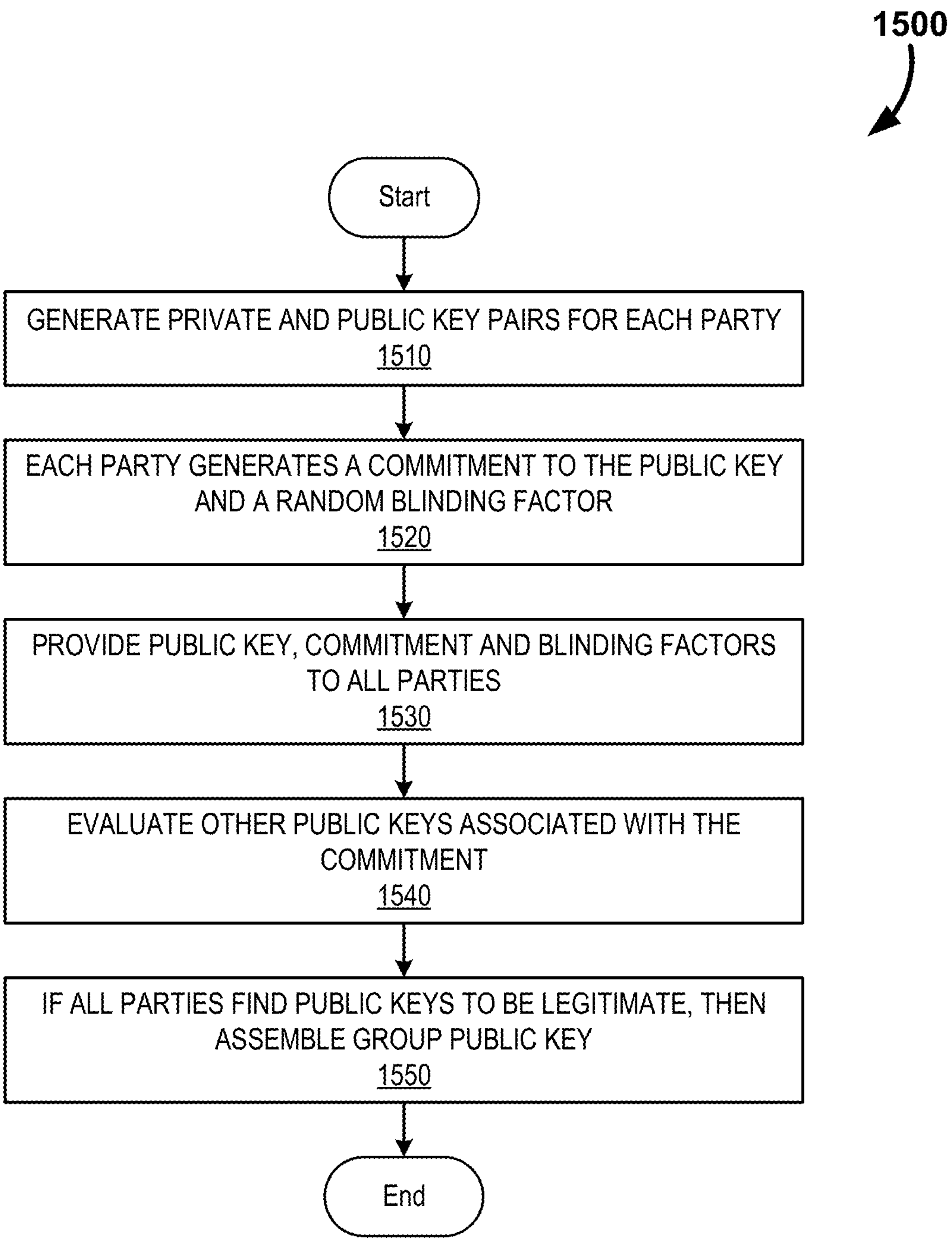
FIG. 15 is a flowchart for an example process of key generation and validation, in accordance with some embodiment.

FIG. 14 provides more details on the processing of these sharded keys 1116, 1117 and 1118 respectively, as seen generally at 1400. Initially, the sharded keys are disassembled and reconstituted into the ECC private keys 1112, 1113 and 1115 respectively. The shards need to also include private random blinding values that the enclave can use to evaluate each of the commitment values each party is coming with. An aggregator 1410 then takes these individual private keys and generates an aggregate private key.

This aggregated private key is provided to each of the trusted parties 1420 which have wrapped content encryption keys 1430. The aggregated private key is used by a decryption module 1440 to unwrap/decrypt the content encryption key 1450 for the given party 1420. This content encryption key 1450 may then be leveraged to release information/content for consumption by the trusted party 1420.

FIGS. 15-20 provide a more detailed description of example processes of distributed key generation. In the example process 1500, the private and public keys are generated at each party (at 1510). As previously noted, elliptical curve cryptography is utilized for this key generation process. Each party also generates a commitment to the public key (as previously discussed) and a random binding factor (at 1520).

The commitment, public key and binding factor are then provided to all parties (at 1530) for verification. Each party then evaluates the other public keys associated with the commitment (at 1540). If the public keys are determined to be legitimate, then the aggregate public key can be generated (at 1550). If any of the commitments are gamed in any manner the system detects the issue when determining if the public keys are legitimate, thereby stopping the process. Similarly, upon sharding, the commitments may also be checked and ensure the process is secure.

Figure 16:
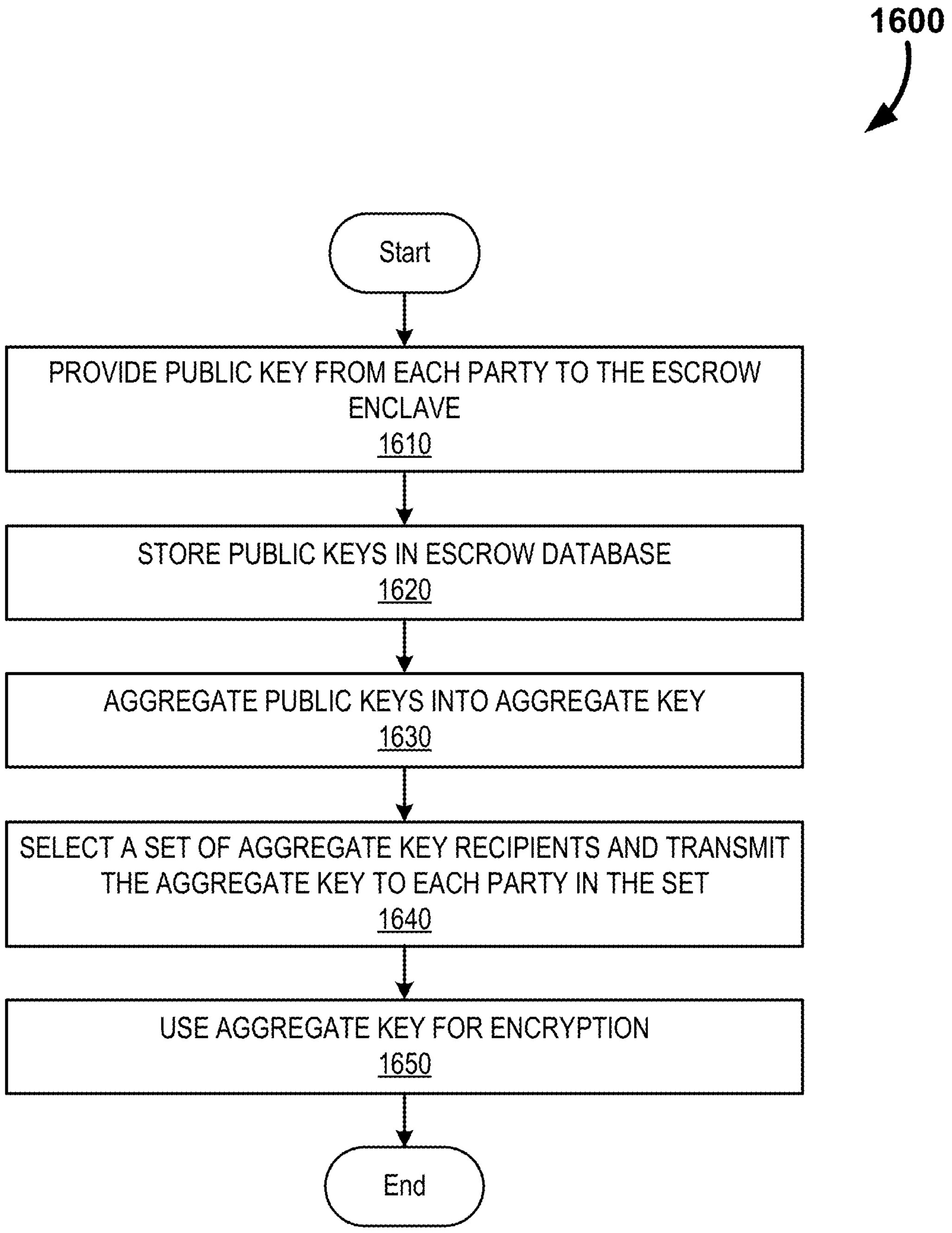
FIG. 16 is a flowchart for an example process of content key encryption, in accordance with some embodiment.

The public keys are aggregated as seen at 1600 of FIG. 16. Initially the public keys from each party are provided to an escrow enclave (at 1610), which is generally managed by the core management system. These keys are stored in a database repository (at 1620) and then are aggregated into the aggregate key (at 1630). A set of aggregate key recipients are selected (at 1640), and the aggregate key is provided back to these parties. The parties then utilize the aggregate key for encryption of content (at 1650).

Figure 17:
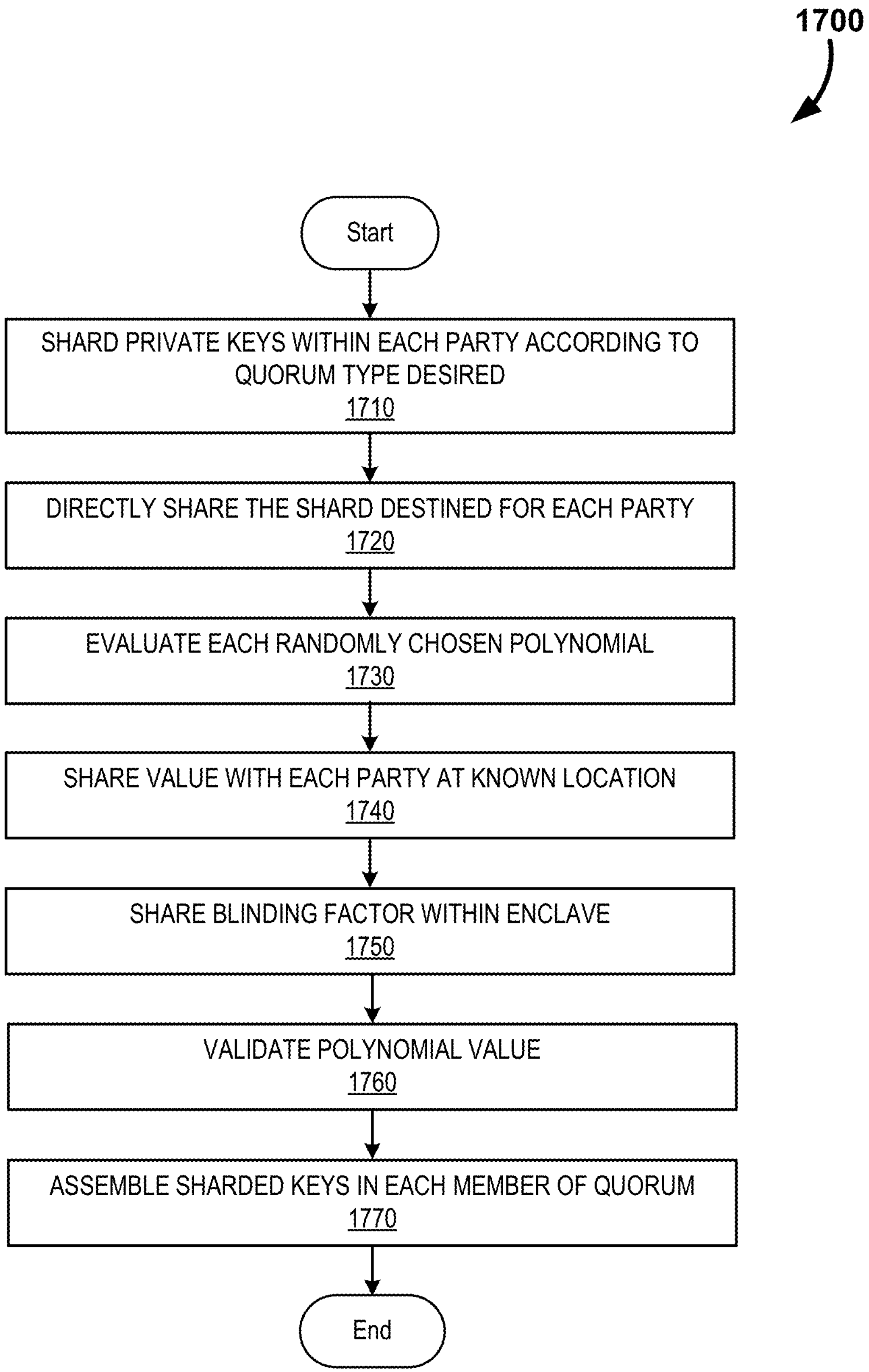
FIG. 17 is a flowchart for an example process of key sharding, in accordance with some embodiment.

In addition, the private keys are fragmented and distributed as seen in 1700 of FIG. 17. In particular, each party may shard/fragment their private key according to the quorum type desired (at 1710). Generally, this includes generating a shard for each trusted party, but in some embodiments, only a subset of the trusted parties may receive a shard. The shards are directly shared between the parties (at 1720). The system evaluates each randomly chosen polynomial (based on the threshold desired to reassemble a secret) at a point on the curve (at 1730). Then this value is shared with each party at a known location (at 1740). The secret owner is going to also commit to this value using the standard commitment process above. and only when the enclave is up (at 1750) will the secret owner share the random blinding factor to each party. The binding factor is used for a validation that the polynomial value is legitimate (at 1760). Assuming the legitimacy of each location on each curve, the enclave will then be responsible for assembling each individual party's secret and will then proceed to assemble the final group secret key (at 1730).

Figure 18:
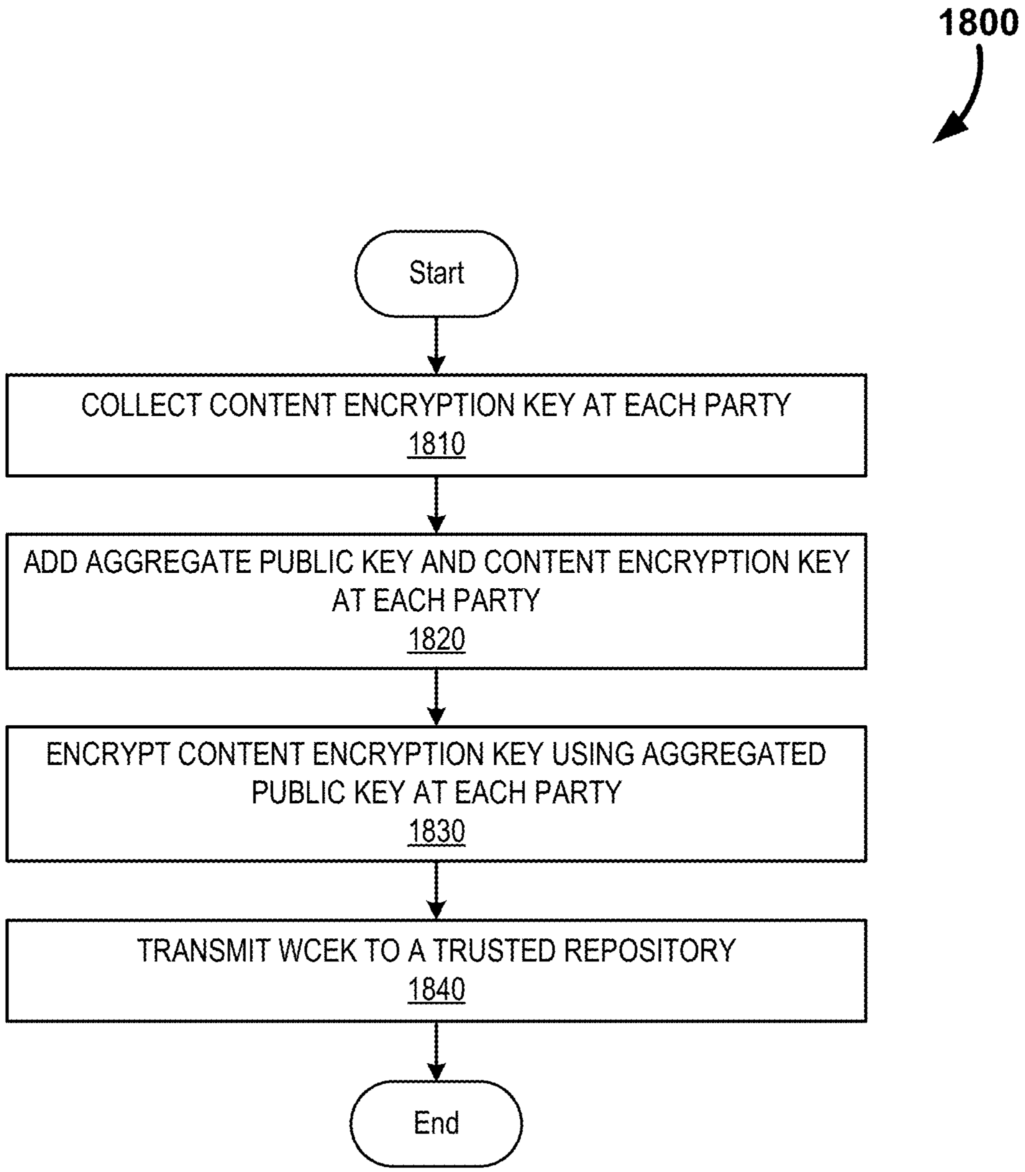
FIG. 18 is a flowchart for an example process wrapping content encryption keys, in accordance with some embodiment.

Additionally, content encryption keys for each party are wrapped, as seen at 1800 of FIG. 18. This process begins with each party collecting a content encryption key (at 1810). The aggregate public key is then added to the content encryption key (at 1820) and is used to encrypt/wrap the content encryption key (at 1830). The wrapped content encryption keys for each party involved are then transmitted to a trusted repository (at 1840). Generally, this repository may be part of the core management system, but any trusted party may perform this role.

Figure 19:
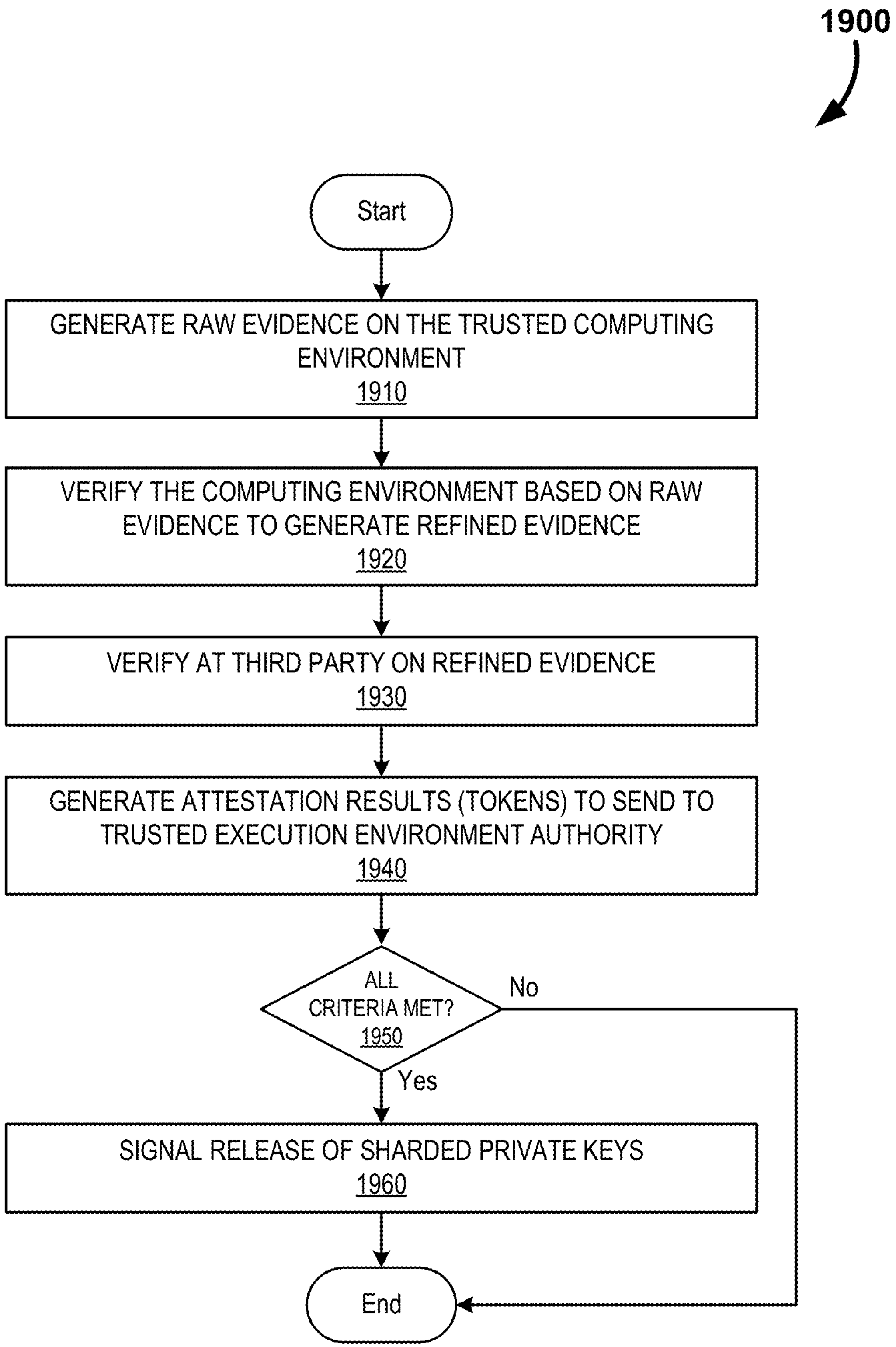
FIG. 19 is a flowchart for an example process of release of sharded private keys, in accordance with some embodiment.

Subsequently, the trusted computing environment may undergo an attestation process for the release and utilization of the sharded private keys, shown generally at 1900 in relation to FIG. 19. In this example process, the raw evidence regarding the trusted computing environment is initially generated (at 1910). The computing environment is verified based upon the raw evidence to generate a refined set of evidence (at 1920). This refined evidence is then passed to a third party for verification of the environment (at 1930). Attestation results, or tokens, are generated to send to the trusted execution environment authority (at 1940). The system may also undergo attestation of other, non-trusted environment "mechanical criteria". This mechanical criterion may be any desired criteria. For example, a dataset subject to GDPR may include criteria that each of the trusted parties are in GDPR compliant jurisdictions. If attestation is successful and all criteria is met (at 1950) the authority may release and/or signal release of the sharded private keys (at 1960). If any criterion is absent, the system may refrain from releasing the sharded private keys.

Figure 20:
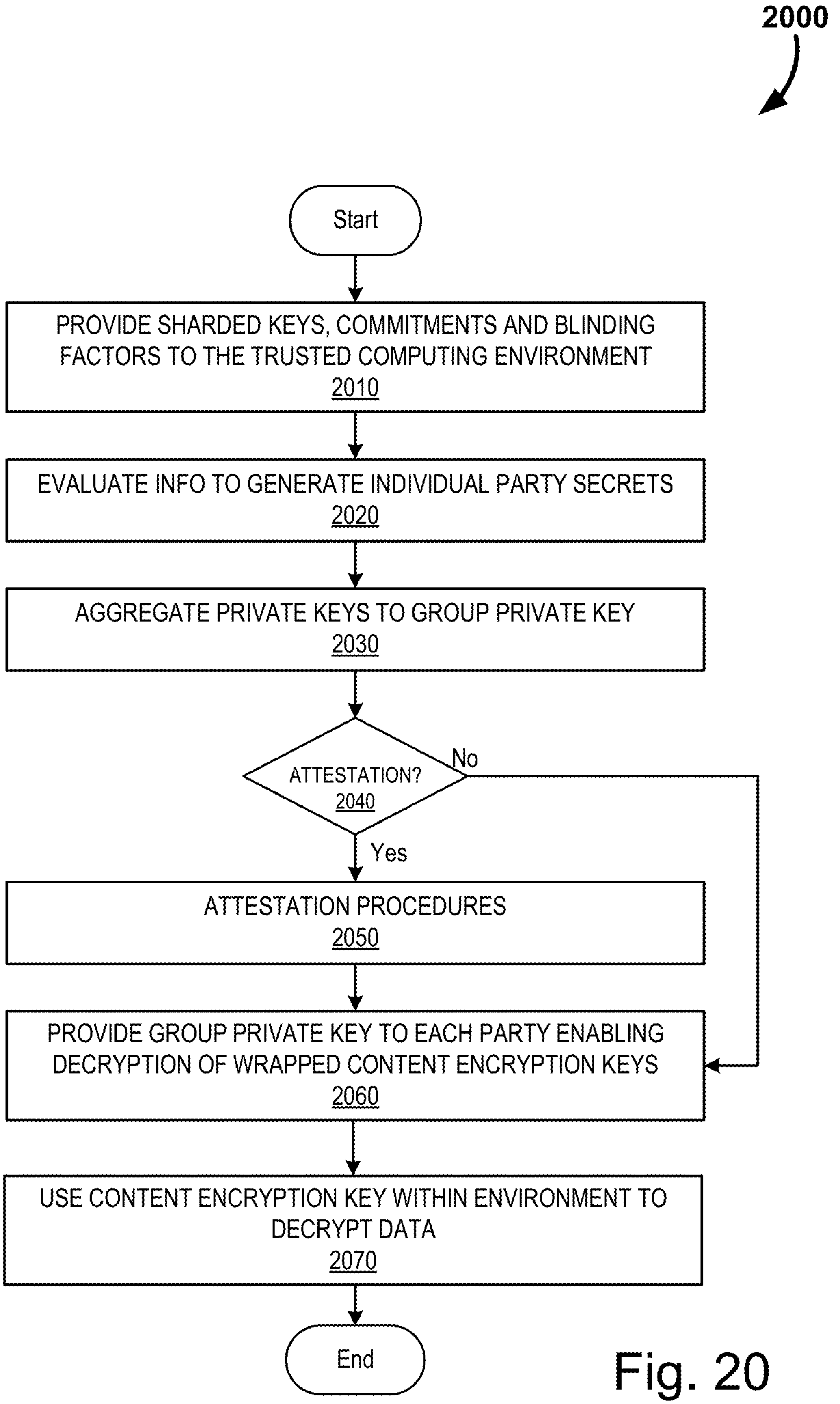
FIG. 20 is a flowchart for an example process of content encryption key decryption, in accordance with some embodiment.

Subsequently, the sharded keys are then utilized to decrypt the WCEKs, as seen generally at 2000 in relation to FIG. 20. In this example process, the sharded keys, after release, are made available to the trusted computing environment along with the blinding factors and the commitments (at 2010). The ECC private keys are the reassembled from the various sharded keys after evaluation of the blinding factors and commitments (at 2020) and these reassembled private keys may be aggregated into a group private key (at 2030).

Next the system may determine if it is desired to undergo a similar attestation process as was performed on the trusted environment (at 2040). If so, attestation may occur (at 2050). After attestation (or if it wasn't needed/desired) the group private key may be provided to each party (at 2060). This enables decryption of the wrapped content encryption keys for downstream uses, such as the decryption of data within the environment (at 2070).

One particularly powerful use case for the distributed key generation and quorum-based decryption, as detailed above, is in situations where the underlying secret contains pieces of information from the various trusted parties. In such situations, the trusted parties may desire to release the secret among they quorum only when all parties above the threshold are in agreement. Large Language Models (LLMs) are prime examples of such data types. A LLM is trained on various sources of data found in each of the trusted parties. The LLM, by its nature, "memorizes" some of the underlying training data. As such, an LLM may be a source of data exfiltration, and as such the parties may desire to require a quorum before the LLM is released and made usable by the parties.

Figure 21A:
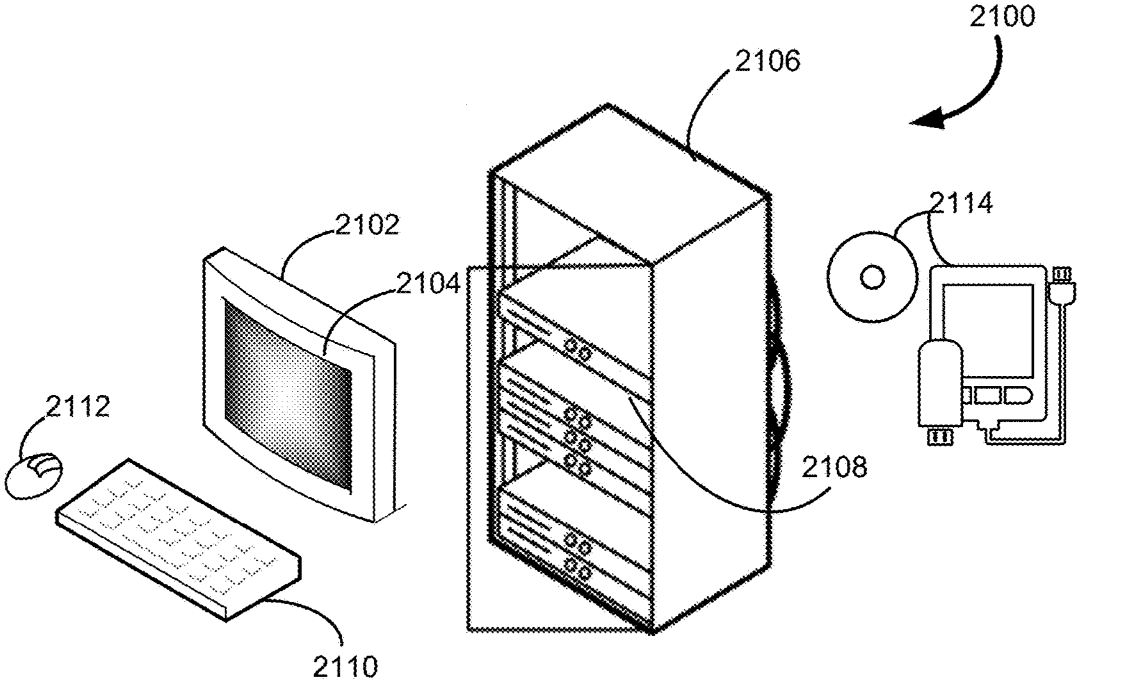
FIGS. 21A and 21B are illustrations of computer systems capable of implementing the confidential computing, in accordance with some embodiments.
Figure 21B:
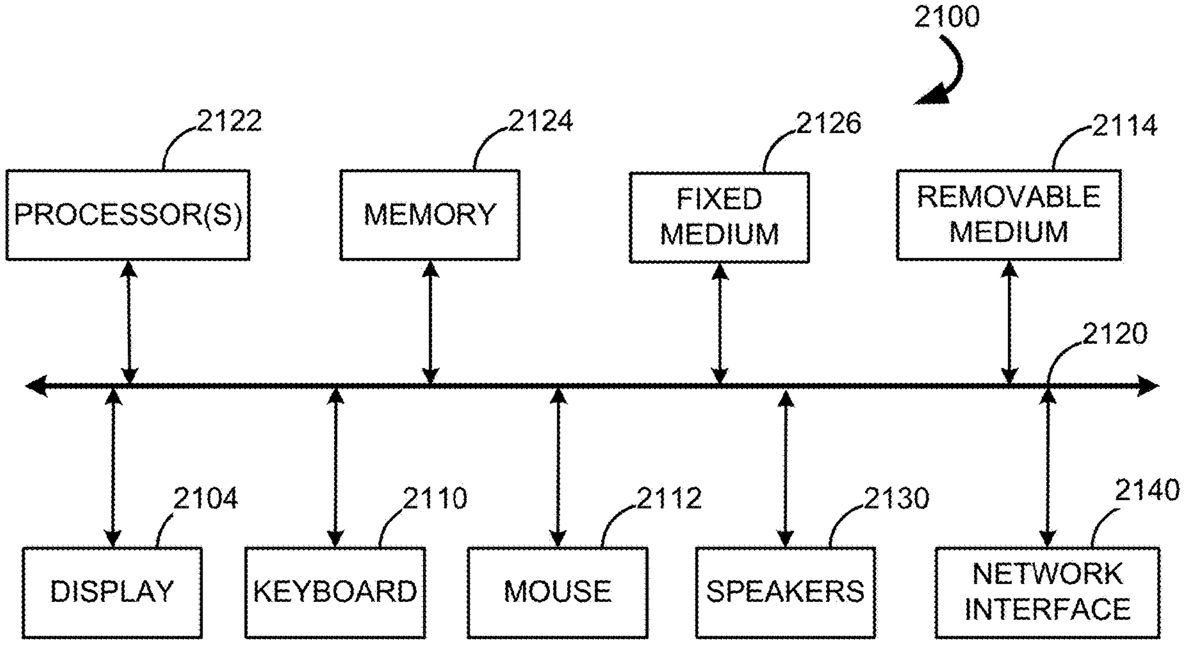

Now that the systems and methods for distributed key generation have been provided, attention shall now be focused upon apparatuses capable of executing the above functions in real-time. To facilitate this discussion, FIGS. 21A and 21B illustrate a Computer System 2100, which is suitable for implementing embodiments of the present invention. FIG. 21A shows one possible physical form of the Computer System 2100.

Of course, the Computer System 2100 may have many physical forms ranging from a printed circuit board, an integrated circuit, and a small handheld device up to a huge supercomputer. Computer system 2100 may include a Monitor 2102, a Display 2104, a Housing 2106, server blades including one or more storage Drives 2108, a Keyboard 2110, and a Mouse 2112. Medium 2114 is a computer-readable medium used to transfer data to and from Computer System 2100. FIG. 21B is an example of a block diagram for Computer System 2100. Attached to System Bus 2120 are a wide variety of subsystems. Processor(s) 2122 (also referred to as central processing units, or CPUs) are coupled to storage devices, including Memory 2124. Memory 2124 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable form of the computer-readable media described below. A Fixed Medium 2126 may also be coupled bi-directionally to the Processor 2122; it provides additional data storage capacity and may also include any of the computer-readable media described below. Fixed Medium 2126 may be used to store programs, data, and the like and is typically a secondary storage medium (such as a hard disk) that is slower than primary storage. It will be appreciated that the information retained within Fixed Medium 2126 may, in appropriate cases, be incorporated in standard fashion as virtual memory in Memory 2124. Removable Medium 2114 may take the form of any of the computer-readable media described below.

Processor 2122 is also coupled to a variety of input/output devices, such as Display 2104, Keyboard 2110, Mouse 2112 and Speakers 2130. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 2122 optionally may be coupled to another computer or telecommunications network using Network Interface 2140. With such a Network Interface 2140, it is contemplated that the Processor 2122 might receive information from the network, or might output information to the network in the course of performing the above-described confidential computing processing of protected information, for example PHI. Furthermore, method embodiments of the present invention may execute solely upon Processor 2122 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 2100 can be controlled by operating system software that includes a file management system, such as a medium operating system. One example of operating system software with associated file management system software is the family of operating systems known as Windows® from Microsoft Corporation of Redmond, Washington, and their associated file management systems.

Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, Glasses with a processor, Headphones with a processor, Virtual Reality devices, a processor, distributed processors working together, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer (or distributed across computers), and when read and executed by one or more processing units or processors in a computer (or across computers), cause the computer(s) to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized method of distributed key generation for quorum-based content release in a trusted computing environment, the method comprising:

generating, at each of a plurality of trusted parties, a unique public key and a unique private key using elliptical curve cryptography (ECC);

generate, at the plurality of trusted parties, a commitment;

receiving, at each of the plurality of trusted parties, the unique public keys from each of the plurality of trusted parties after validating the commitment from each of the plurality of trusted parties;

aggregating, at a management system, the unique public keys to generate an aggregate public key;

encrypting, at at least one of the plurality of trusted parties, content encryption keys using the aggregate public key to generate wrapped content encryption keys (WCEK);

sharding, at each of the trusted parties, the unique private keys; and generating, at each trusted party, a sharded private key.

2. The method of claim 1, further comprising, at each of the trusted parties:

receiving criteria;

releasing the sharded private keys;

reassembling the unique private keys;

generating an aggregate private key; and decrypting the WCEK using the aggregate private key.

3. The method of claim 2, further comprising attesting a trusted computing environment prior to releasing the sharded private keys.

4. The method of claim 3, wherein the attesting includes an internal attestation and a third-party attestation.

5. The method of claim 2, further comprising attesting a trusted computing environment, and releasing the aggregate private key responsive to the attestation.

6. The method of claim 1, wherein the unique private key and unique public key at each of a plurality of trusted parties are generated using elliptical curve digital signature algorithm.

7. The method of claim 2, wherein the criteria include a location requirement for the plurality of trusted parties.

8. The method of claim 1, wherein sharding the unique private key at each of a plurality of trusted parties includes:

dividing the unique private key in each trusted party into N pieces, wherein N is an integer corresponding to the number of the plurality of trusted parties;

generating a schema for which unique piece of each unique private key is to be sent to each of the plurality of trusted parties;

transferring through direct communication between each of the trusted parties the appropriate unique piece of the unique private key according to the schema.

9. The method of claim 8, wherein the generated sharded private key includes an assembly of the unique pieces from each trusted party.

10. The method of claim 1, further comprising performing key validation after generating the unique public key and the unique private key.

11. A system of distributed key generation for quorum-based content release in a trusted computing environment, the system comprising:

a plurality of trusted parties, each trusted party comprising a sequestered computing node including a key server configured to generate a unique public key and a unique private key using elliptical curve cryptography (ECC), and generate a commitment at each of the trusted parties;

an interface at each of the plurality of trusted parties for receiving the public keys after validating the commitment;

a management system, including a processor and memory, configured to aggregate the unique public keys to generate an aggregate public key;

an encryption processor at each of the plurality of trusted parties configured to encrypt content encryption keys at at least one of the plurality of trusted parties using the aggregate public key to generate wrapped content encryption keys (WCEK); and a key processor at each of the plurality of trusted parties configured to shard the unique private keys, and generate a sharded private key at each trusted party.

12. The system of claim 11, further comprising an attestation and decryption processor at each of the trusted parties for:

receiving criteria;

releasing the sharded private keys;

reassembling the private keys;

generating an aggregate private key; and decrypting the WCEK using the aggregate private key.

13. The system of claim 12, wherein the attestation and decryption processor further attests a trusted computing environment prior to releasing the sharded private keys.

14. The system of claim 13, wherein the attesting includes an internal attestation and a third-party attestation.

15. The system of claim 12, wherein the attestation and decryption processor further attests a trusted computing environment, and releasing the aggregate private key responsive to the attestation.

16. The system of claim 11, wherein the unique private key and unique public key are generated using elliptical curve digital signature algorithm.

17. The system of claim 12, wherein the criteria include a location requirement for the plurality of trusted parties.

18. The system of claim 11, wherein sharding the unique private key at each of a plurality of trusted parties includes:

dividing the unique private key in each trusted party into N pieces, wherein N is an integer corresponding to the number of the plurality of trusted parties;

generating a schema for which unique piece of each unique private key is to be sent to each of the plurality of trusted parties;

transferring through direct communication between each of the trusted parties the appropriate unique piece of the unique private key according to the schema.

19. The system of claim 18, wherein the generated sharded private key includes an assembly of the unique pieces from each trusted party.

20. The system of claim 11, further comprising performing key validation after generating the unique public key and the unique private key.

21. The system of claim 15, wherein the plurality of trusted parties host data for the training of a Large Language Model (LLM), wherein the LLM is encrypted by the aggregate public key, and wherein the LLM is only decryptable when a quorum of the plurality of trusted parties releases the aggregate private key.

* * * * *